United States Patent
Koumo et al.

(10) Patent No.: US 6,606,760 B1
(45) Date of Patent: Aug. 19, 2003

(54) VEHICLE WIPER DEVICE WITH INSTALLATION POSITIONING MECHANISM

(75) Inventors: Yoshiyuki Koumo, Toyohashi (JP); Keisuke Kanazawa, Hamamatsu (JP)

(73) Assignee: Asmo Co., Ltd, Shizuoka-ken (JP)

( * ) Notice: Subject to any disclaimer, the term of this patent is extended or adjusted under 35 U.S.C. 154(b) by 0 days.

(21) Appl. No.: 09/521,976

(22) Filed: Mar. 9, 2000

(30) Foreign Application Priority Data

Mar. 11, 1999 (JP) .......................................... 11-065168
Mar. 11, 1999 (JP) .......................................... 11-065169

(51) Int. Cl.[7] .............................. B60S 1/34; B60S 1/58; B60S 1/24
(52) U.S. Cl. .................... 15/250.3; 15/250.31; 29/464; 29/271; 296/96.17
(58) Field of Search .......................... 15/250.3, 250.31, 15/250.16, 250.17, 250.34; 296/96.2, 96.17, 96.13, 96.21, 96.15; 29/464, 271, 466, 467

(56) References Cited

U.S. PATENT DOCUMENTS 2,046,108 A * 6/1936 Drew ........................ 15/250.3

FOREIGN PATENT DOCUMENTS

| DE | 2728088 | * | 1/1978 | ................ 15/250.3 |
| DE | 3313057 | * | 10/1984 | ................ 15/250.3 |
| GB | 1 448 892 | | 9/1976 | |
| JP | 55-083643 | | 6/1980 | |
| JP | 2-18761 A | | 2/1990 | |
| JP | 11-291873 | | 10/1999 | |
| JP | 2000-103319 | | 11/2000 | |

* cited by examiner

Primary Examiner—Gary K. Graham
(74) Attorney, Agent, or Firm—Robert D. Buyan; Stout, Uxa, Buyan & Mullins, LLP

(57) ABSTRACT

A wiper device is located between a rear door and a rear window, which is opened independently from the door. An actuator having an output shaft is attached to the rear door. A power transmission unit includes a shaft holder attached to the rear window and a pivot shaft supported by the shaft holder. Before the shaft holder is attached to the rear window, a positioning mechanism fixes the position of the power transmission unit relative to the actuator such that the axis of the pivot shaft is aligned with the axis of the output shaft. Thus, the axes of the output shaft and the pivot shaft are fixed during the installation process. Therefore, no adjustment of these axis is required during installation.

20 Claims, 24 Drawing Sheets

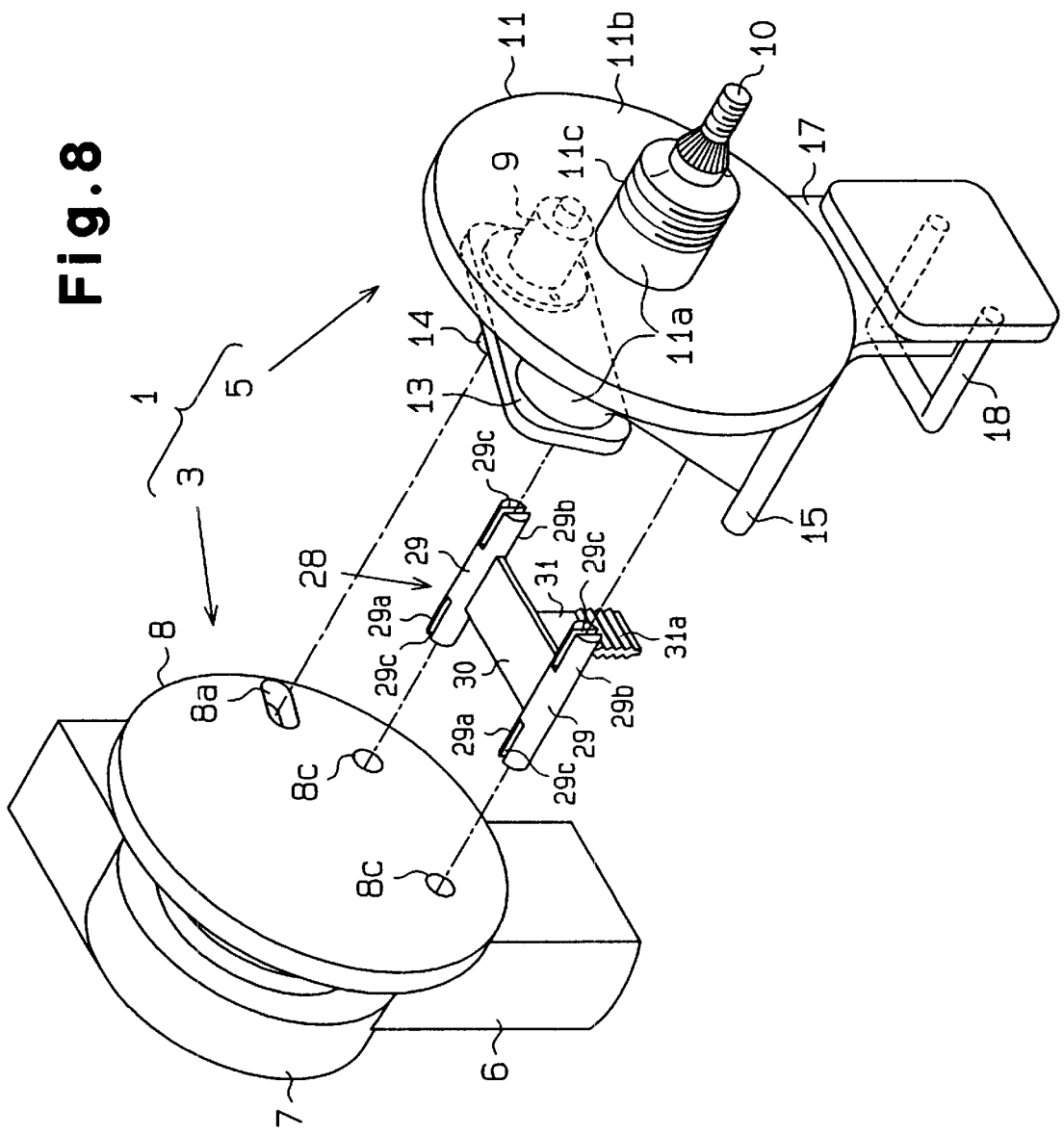

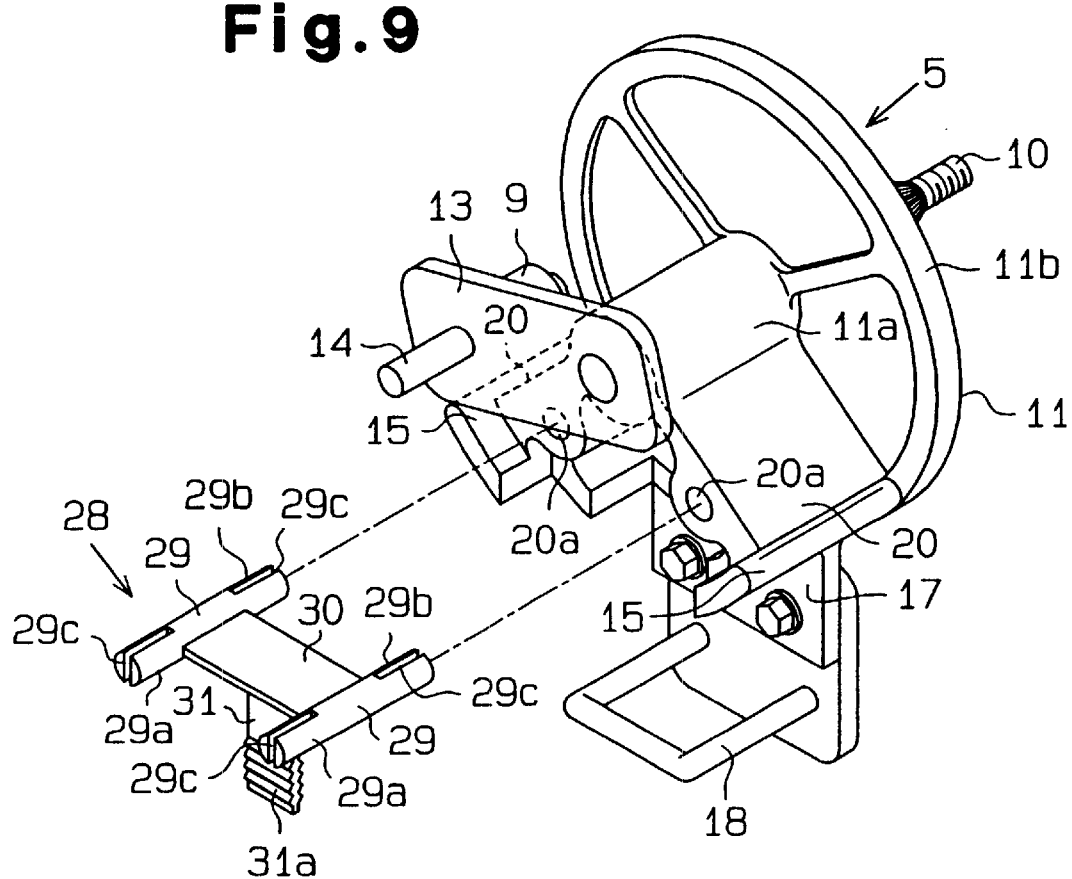

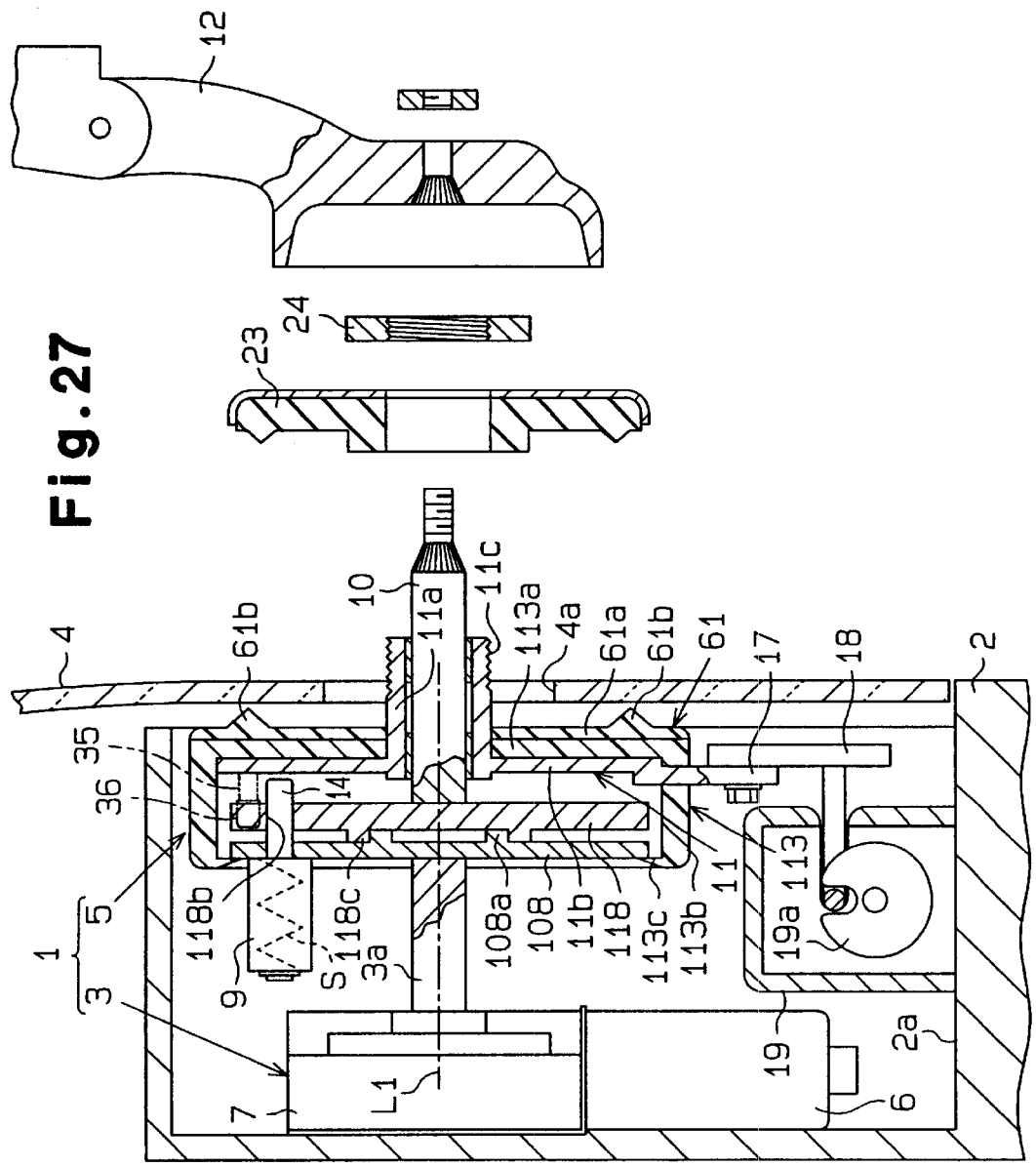

VEHICLE WIPER DEVICE WITH INSTALLATION POSITIONING MECHANISM

BACKGROUND OF THE INVENTION

The present invention relates to a vehicle wiper device, and more particularly to a wiper device for wiping an openable rear window and the installation method.

A typical station wagon or a hatchback has a rear door. Some such doors have openable windows that are opened independently from the rear door. A typical wiper device for wiping the window glass of such a rear door is directly attached to the window glass.

The wiper device has a relatively heavy actuator. When the window is shut, the glass may forcefully contact the rear door. This applies a relatively great force to the glass where the actuator is fixed. This can damage the glass. Manually opening and closing the window requires relatively great physical force. Also, if the actuator is attached to the glass, the wiring for supplying electricity to the motor in the actuator becomes complicated.

To solve these problems, a wiper device having an actuator attached to the rear door has been proposed. In this device, a wiper arm is pivotally supported by the rear window. When the rear window is closed, the wiper arm is coupled to the actuator.

The actuator is fixed to the rear door. A pivot disk is fixed to an output shaft of the actuator. The pivot disk is rotated within a predetermined angular range, and the direction of rotation alternates. The disk has a coupler hole, which is radially spaced from the axis of the output shaft. A pivot shaft is attached to the rear door through the shaft holder. When the rear window is closed, the axis of the pivot shaft needs to be aligned with the axis of the output shaft. The distal end of the pivot shaft extends to the rear and exterior of the vehicle. The wiper arm is fixed to the distal end of the pivot shaft. The distal end of the wiper arm is coupled to a wiper blade (not shown). The wiper blade wipes the surface of the rear window. The distal end of the pivot shaft (the end extending to the actuator) is coupled to the crank lever. A coupler pin is located at the distal end of the crank lever.

When the rear window is closed, the coupler pin enters the coupler hole in the disk, which couples the crank lever to the disk. When the actuator pivots the disk, the crank lever pivots integrally with the disk. The alternating rotation of the crank lever is transmitted to the wiper arm by the pivot shaft. Accordingly, the wiper arm pivots in an angular range that corresponds to the pivot range of the disk, which causes the wiper blade to wipe the surface of the rear window.

If the output shaft of the actuator is misaligned with the pivot shaft when the wiper device is installed to the vehicle, the axis of rotation of the pivot disc does not coincide with the pivot axis of the crank lever. This prevents smooth movement of the wiper device and causes the rotation angle of the disc to differ from the pivot angle of the crank lever. As a result, an error in the pivotal angle of the wiper arm occurs, and the path of the wiper blade may be different from that desired. Accordingly, the position of the actuator or that of the wiper device must be accurately adjusted to align the axes of the output shaft and the pivot shaft. This complicates installation of the wiper device.

SUMMARY OF THE INVENTION

An objective of the present invention is to provide a vehicle wiper device that is easily installed and prevents the output shaft from being misaligned from the pivot shaft and the method of installing the wiper device.

To achieve the above objective, the present invention provides a wiper device for wiping a window supported by a support. The wiper device is located between the window and the support. The window opens and closes an opening in the support. The device comprises an actuator attached to the support. The actuator has an output shaft and a first coupler member attached to the output shaft. The actuator pivots the first coupler member in a first angle range. A power transmission unit includes a shaft holder attached to the window, a pivot shaft supported by the shaft holder and a second coupler member attached to the pivot shaft. When the window is closed, the second coupler member is coupled to the first coupler member to transmit rotation of the output shaft to the pivot shaft. A wiper arm is attached to the pivot shaft. When the actuator is activated with the second coupler member coupled to the first coupler member, the wiper arm pivots in an angle range corresponding to the first angle range. When the wiper device is installed, a positioning mechanism provisionally fixes the position of the power transmission unit relative to the actuator such that the axis of the pivot shaft is aligned with the axis of the output shaft.

The present invention further provides a method of installing a wiper device. The method comprises: attaching an actuator to a support, wherein the actuator includes an output shaft and a first coupler member attached to the output shaft; attaching a shaft holder of a power transmission unit to a window, wherein the power transmission unit includes a pivot shaft supported by the shaft holder and a second coupler member attached to the pivot shaft, wherein rotation of the output shaft is transmitted to the pivot shaft when the second coupler member is coupled to the first coupler member; fixing the position of the power transmission unit relative to the actuator such that the axis of the pivot shaft is aligned with the axis of the output shaft prior to at least one of attaching the actuator to the support and attaching the shaft holder to the window; and releasing the power transmission unit relative to the actuator after the actuator is attached to the support and after the shaft holder is attached to the window.

The present invention further provides a method of installing a wiper device. The method comprises: attaching an actuator to a support, wherein the actuator includes an output shaft and a first coupler member attached to the output shaft; attaching a shaft holder of a power transmission unit to a window after attaching the actuator to the support, wherein the power transmission unit includes a pivot shaft supported by the shaft holder and a second coupler member attached to the pivot shaft, wherein rotation of the output shaft is transmitted to the pivot shaft when the second coupler member is coupled to the first coupler member; and fixing the position of the power transmission unit relative to the actuator such that the axis of the pivot shaft is aligned with the axis of the output shaft prior to at least attaching the shaft holder to the window, wherein the shaft holder moves toward the window and releases the fixation of the power transmission unit relative to the actuator when the shaft holder is attached to the window.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is an exploded perspective view showing a wiper device according to a further embodiment of the present invention;

FIG. 9 is a rear perspective view showing a power transmission unit of FIG. 8;

FIG. 27 is a cross-sectional view showing a wiper device according to a further embodiment of the present invention.

DETAILED DESCRIPTION OF THE PREFERRED EMBODIMENTS

Figure 1:
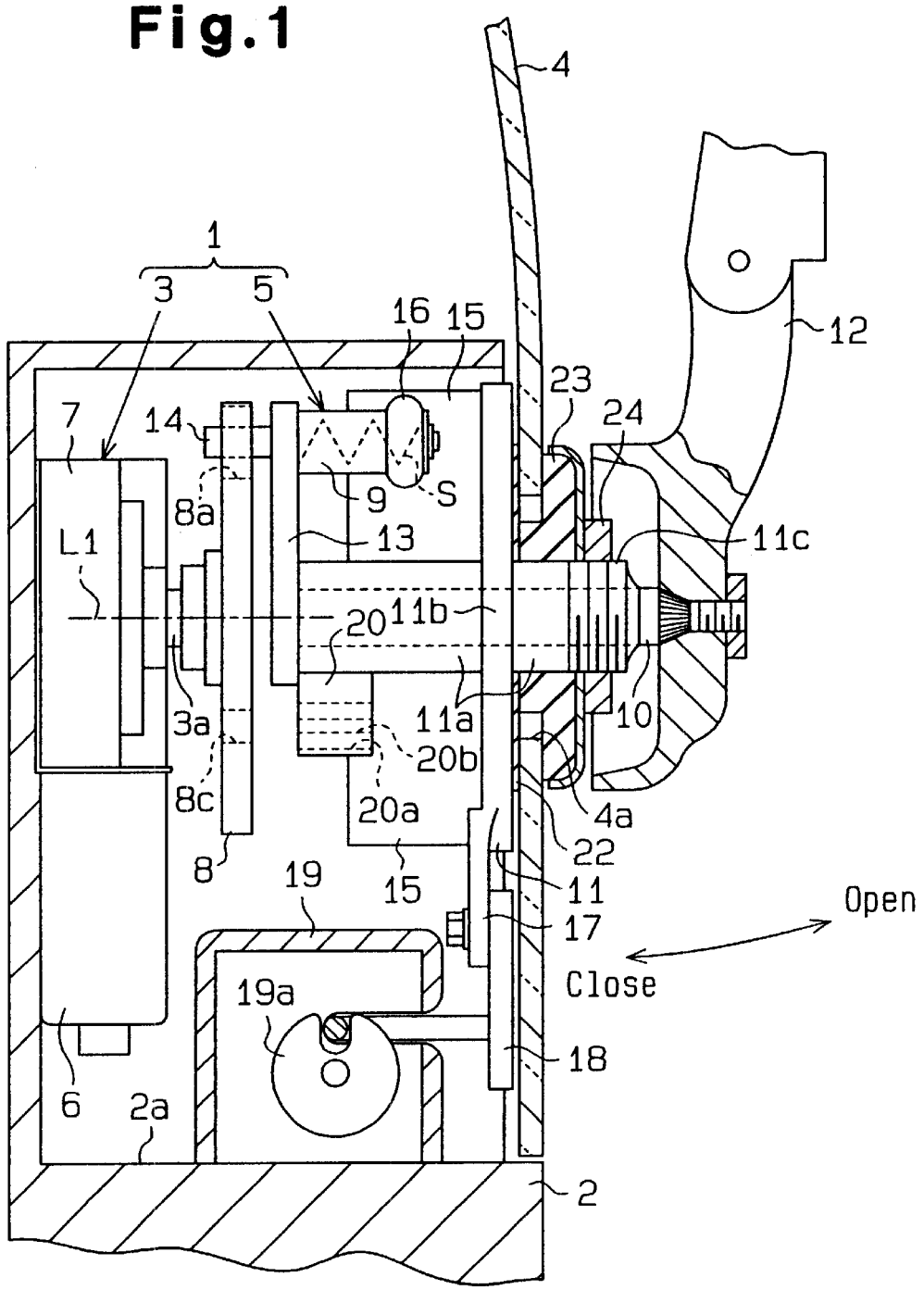
FIG. 1 is a cross-sectional view showing a wiper device according to a first embodiment of the present invention when a rear window is closed.

A first embodiment according to the present embodiment ill now be described with reference to FIGS. 1–7(b). A wiper device 1 of FIGS. 1–3 wipes a rear window 4. The rear window 4 is supported by and pivots relative to the rear door 2 to open a window opening formed in the rear door 2. The wiper device includes an actuator 3 attached to a support 2a of the rear door 2, a power transmission unit 5 attached to the rear window 4, and a wiper arm 12 attached to the power transmission unit 5.

The actuator 3 includes a motor 6 and a speed reducer 7. An output shaft 3a extends from the speed reducer 7. A pivot disc 8, which is a first coupler member, is fixed to the output shaft 3a. Rotation of the motor 6 is converted into pivotal movement of the pivot disk 8 through the speed reducer 7 and the output shaft 3a. Accordingly, the pivot disc 8 pivots in a predetermined angular range.

The pivot disk 8 includes a coupler hole 8a, or a first engagement member, which is radially spaced from the axis L1 of the output shaft 3a (or pivot disk 8). The coupler hole 8a passes through the pivot disk 8 and is radially elongated. The pivot disc 8 also includes a front positioning hole 8c, which passes through the disc 8. In this embodiment, the front positioning hole 8c is angularly spaced by 180 degrees from the coupler hole 8a about the axis L1 of the pivot disc 8. The distance from the axis L1 to the front positioning hole 8c preferably differs from the distance from the axis L1 to the coupler hole 8a. In the present embodiment, the distance from the axis L1 to the positioning hole 8c is less than that from the axis L1 to the coupler hole 8a. Accordingly, the movement path of the coupler hole 8a does not coincide with that of the positioning hole 8c.

The transmission unit 5 includes a shaft holder 11, which is fixed to the rear window 4. The shaft holder 11 pivotally supports a pivot shaft 10. When the rear window 4 is closed as shown in FIG. 1, the pivot shaft 10 is coaxially aligned with the output shaft 3a.

The shaft holder 11 includes a cylinder 11a and a flange 11b. The cylinder 11a supports the pivot shaft 10, and the flange 11b is located at a middle part of the cylinder 11a. One end of the cylinder 11a extends to the exterior of the rear window 4, and a male thread 11c is formed on the end. The other end of the cylinder 11a extends toward the actuator 3, and a positioning portion 20 radially extends from that end.

A rear positioning hole 20a passes through the positioning portion 20 and is parallel to the axis of the pivot shaft 10. The distance between the axis of the rear positioning hole 20a and the axis of the pivot shaft 10 is equal to the distance between the axis of the front positioning hole 8c and the axis L1 of the output shaft 3a. When the rear window 4 is closed, the positioning holes 8c, 20a are coaxial and are located the same distance from the axis L1 of the output shaft 3a. A groove 20b extends axially in the wall that defines the rear positioning hole 20a.

A circular installation hole 4a passes through the rear window 4. The diameter of the installation hole 41 is greater than the outer diameter of the cylinder 11 and is smaller than the outer diameter of the flange 11b. A packing 22 is attached to a surface of the flange 11b facing the rear window 4. The cylinder 11a passes through the installation hole 4a and the packing 22 contacts the interior surface of the rear window 4. Then, an outer bushing 23 is attached to the cylinder 11a. Subsequently, a nut 24 is fastened to the male thread 11c, which fixes the shaft holder 11 to the rear window 4. The outer bushing 23 and the packing 22 prevent water and foreign matter from entering the passenger compartment.

A stay 17 extends downward from the flange 11b of the shaft holder 11. A striker 18 is fixed to the stay 17 by a bolt.

A latch device, which includes a latch wheel 19a, is attached to the support 2a of the rear door 2 to correspond to the striker 18. As shown in FIG. 1, when the rear door is closed, the striker 18 engages the latch wheel 19a and keeps the rear window 4 closed.

The wiper arm 12 is fixed to the distal end of the pivot shaft 10 (the end extending outwardly from the rear window 4). The distal end of the wiper arm is coupled to a wiper blade (not shown) for wiping the exterior surface of the rear window 4.

A crank lever 13, which is a second coupler member, is fixed to the proximal end of the pivot shaft 10 (the end extending toward the actuator 3). A pin holder 9 is attached to the distal end of the crank lever 13. The pin holder 9 extends toward the shaft holder 11. A rubber cushion 16 is attached to the pin holder 9.

A coupler pin 14, or a second engagement member, is supported by the pin holder 13a and moves parallel to the axis of the pivot shaft 10. A spring S is located in the pin holder 9 and urges the coupler pin 14 toward the pivot disc 8. The coupler pin 14 can pass through the coupler hole 8a of the pivot disc 8. The width of the coupler hole 8a (as measured along its minor axis) is slightly greater than the diameter of the coupler pin 14.

A pair of plate-shaped regulators 15 are fixed to the shaft holder 11 and are spaced from one another by a predetermined angle. The rubber cushion 16 of the pin holder 9 abuts against the regulators 15, which determines the pivoting range of the crank lever 13 (or the coupler pin 14). The rubber cushion 16 mitigates shock accompanying the abutment against regulators 15.

The actuator 3 reciprocally moves the pivot disc 8 and the coupler hole 8a within a predetermined moving angular range. The angular range is determined such that the wiper blade wipes the rear window efficiently. When the wiper device 1 stops, the coupler hole 8a is located at one end (an initial position) of the angular range. Accordingly, the pivotal range of the crank lever 13, or the angular range of the coupler pin 14, is substantially equal to the angular range of the coupler hole 8a.

As shown in FIG. 1, when the rear door is closed and the coupler pin 14 passes through the coupler hole 8a in the pivot disc 8, the crank lever 13 is coupled to the pivot disc 8. If the actuator 3 reciprocates the coupler hole 8a within the predetermined angular range, the crank lever 13 pivots integrally with the pivot disc 8. The pivotal movement of the crank lever 13 is transmitted to the wiper arm 12 through the pivot shaft 10. Therefore, the wiper arm 12 pivots in an angular range corresponding to the pivoting range of the pivot disc 8, or the angular range of the coupler hole 8a. This causes the wiper blade to wipe the exterior surface of the rear window 4.

Figure 2:
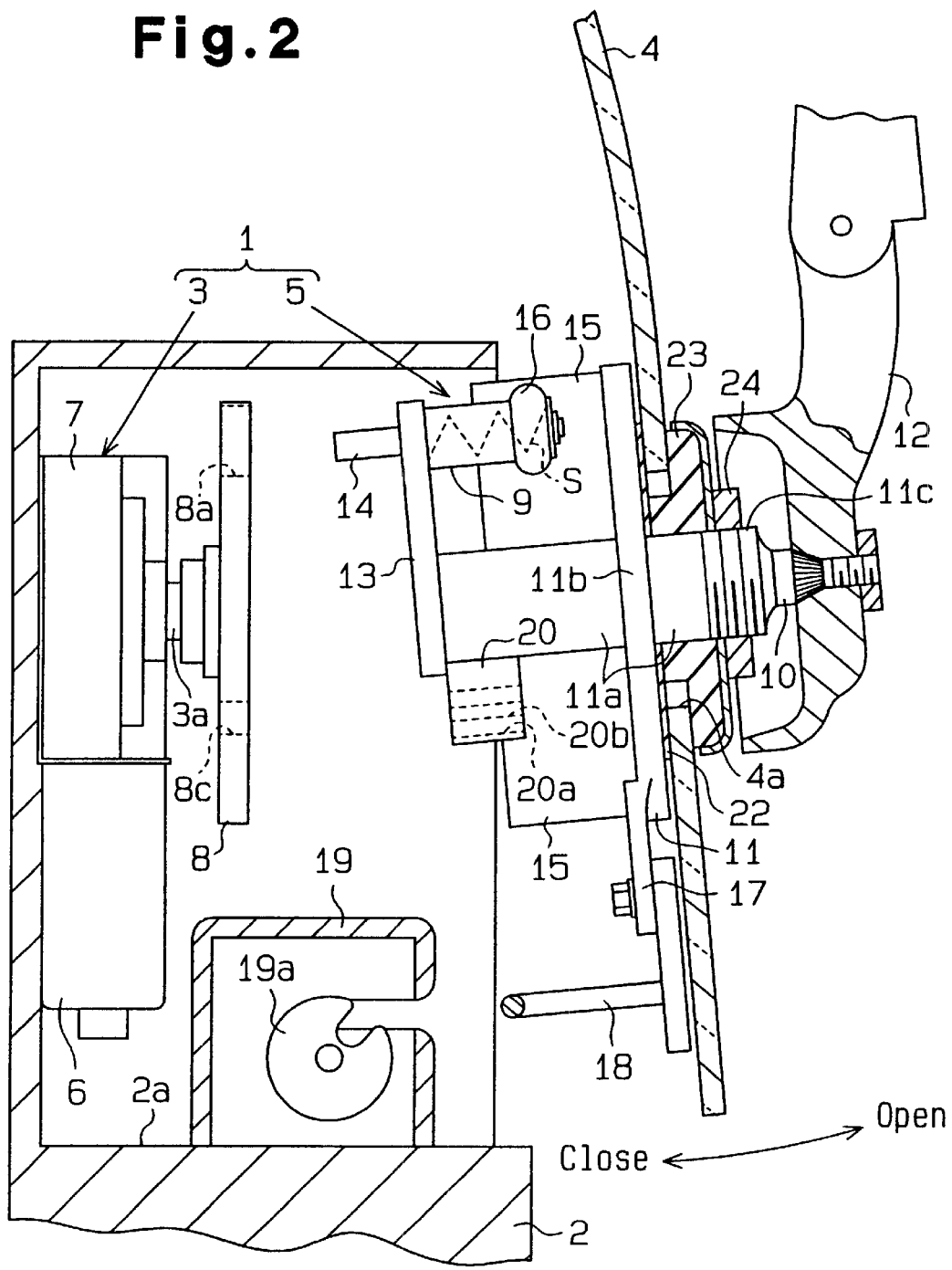
FIG. 2 is a cross-sectional view showing the wiper device of FIG. 1 when the rear window is opened.

As shown in FIG. 2, when the rear window 4 is opened, the coupler pin 14 is removed from the coupler hole 8a, which disengages the crank lever 13 from the pivot disc 8. When the rear window 4 is closed again, the coupler pin 14 passes through the coupler hole 8a, which re-engages the crank lever 13 with the pivot disc 8.

When the rear window 4 is open, the wiper arm 12, the pivot shaft 10, and the crank lever 13 may be moved. Such movement causes the coupler pin 14 to be misaligned with the coupler hole 8a when the rear window 4 is closed. In this case, the coupler pin abuts against the pivot disc 8 and moves rearward against the force of the spring S. If the wiper device is started in this condition, the actuator 3 pivots the pivot disc 8, which aligns the coupler hole 8a with the coupler pin 14. When the coupler hole 8a is aligned with the coupler hole 8a, the coupler pin 14 enters the coupler hole 8a, which causes the crank lever 13 to drive with the pivot disc 8, which causes the wiper blade to wipe the rear window 4.

Figure 3:
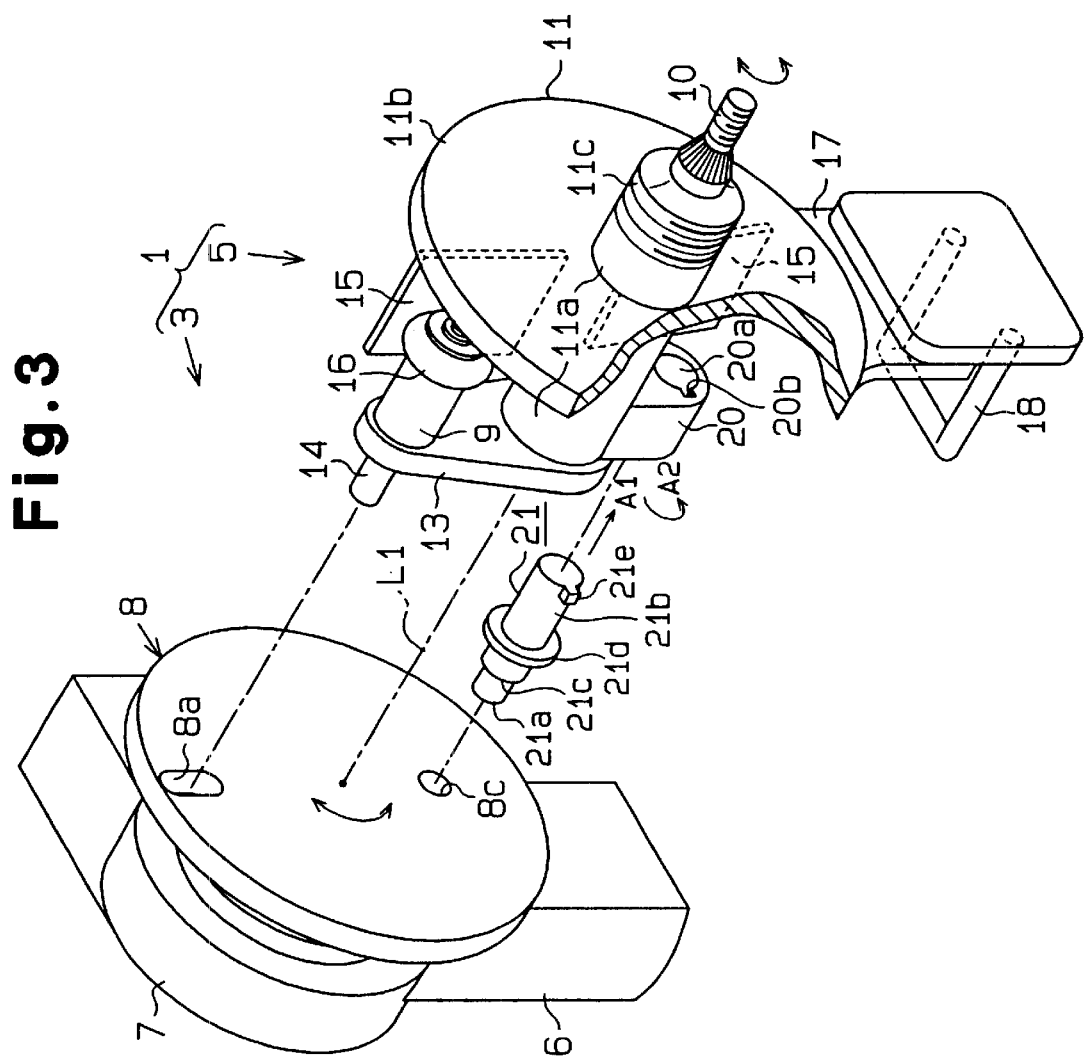
FIG. 3 is an exploded perspective view of the wiper device of FIG. 1.

The procedure of installing the wiper device 1 will now be described with reference to FIGS. 4–6. First, the actuator 3 is fixed to the support 2a of the rear door 2 when the rear window 4 is open. The pivot disc 8 is attached to the actuator prior to fixing the actuator 3 to the support 2a. At this time the coupler hole is preferably positioned at the initial position. Next, the coupler pin 14 of the pre-assembled transmission unit 5 is placed in the coupler hole 8a. Simultaneously, a positioning pin 21, or a positioning jig, shown in FIG. 3 is placed in the positioning holes 8c, 20a and is located between the pivot disc 8 and the positioning portion 20. As a result, the shaft holder 11 is provisionally supported by the pivot disc 8.

As shown in FIG. 3, the positioning pin 21 is generally cylindrical. A flange 21d is formed on the middle part of the positioning pin 21. One end of the positioning pin 21 includes a large diameter portion and a small diameter portion. The other end of the positioning pin 21 forms a rear engagement shaft 21b. A step 21c is formed between the large diameter portion and the small diameter portion. The small diameter portion forms a front engagement shaft 21a. The front engagement shaft 21a has approximately the same diameter as the front positioning hole 8c and engages the first positioning hole 8c. When the front engagement shaft 21a is received in the first positioning hole 8c, the axis of the positioning pin 21 is parallel to the axis L1 of the output shaft 3a (or that of the pivot shaft 8).

The rear engagement shaft 21b has approximately the same diameter as the rear positioning hole 20a and engages the rear positioning hole 20a. A key 21e extends radially from the rear end of the second engagement shaft 21b to correspond to the groove 20b of the rear positioning hole 20a. The distance between the flange 21d and the front of the key 21e is approximately the same as the axial length of the rear positioning hole 20a. When the rear engagement shaft 21b is received in the rear positioning hole 20a, the axis of the positioning pin 21 is parallel to the axis of the pivot shaft 10.

Prior to provisionally supporting the shaft holder 11 on the pivot disc 8, the positioning pin 21 is attached to the positioning portion 20. The key 21e is aligned with the groove 20b, and the rear engagement shaft 21b is placed in the rear positioning hole 20a such that the flange 21d contacts the positioning portion 20 (see the arrow A1 of FIG. 3). Next, the positioning pin 21 is rotated such that the stopper 21e is no longer aligned with the groove 20b (see the arrow A2 of FIG. 3). This prevents the positioning pin 21 from slipping out of the positioning portion 20.

Then, the transmission unit 5 is moved to the actuator 3. The coupler pin 14 is placed in the coupler hole 8c, and the front engagement shaft 21a is placed in the first positioning hole 8c. When the front engagement shaft 21a is placed in the front positioning hole 8c, the step 21c contacts the pivot disc 8.

As a result, the position of the coupler 14 relative to the coupler hole 8a in the circumferential direction of the pivot disc 8 is determined. The positioning pin 21, when placed in the positioning holes 8c, 20a, makes axis L1 of the output shaft 3a coaxial with the axis of the pivot shaft 10. Further, the step 21c, which contacts the pivot disc 8, and the flange 21d, which contacts the positioning portion 20, retain the actuator 3 with respect to the transmission unit 5. Also, the transmission unit 5 is supported by the pivot disc 8 through the positioning pin 21 and through the coupler pin 14. As a result, the position of the transmission unit relative to the actuator is accurately determined such that the axis of the pivot shaft 10 is aligned with the axis L1 of the output shaft 3a.

Figure 4:
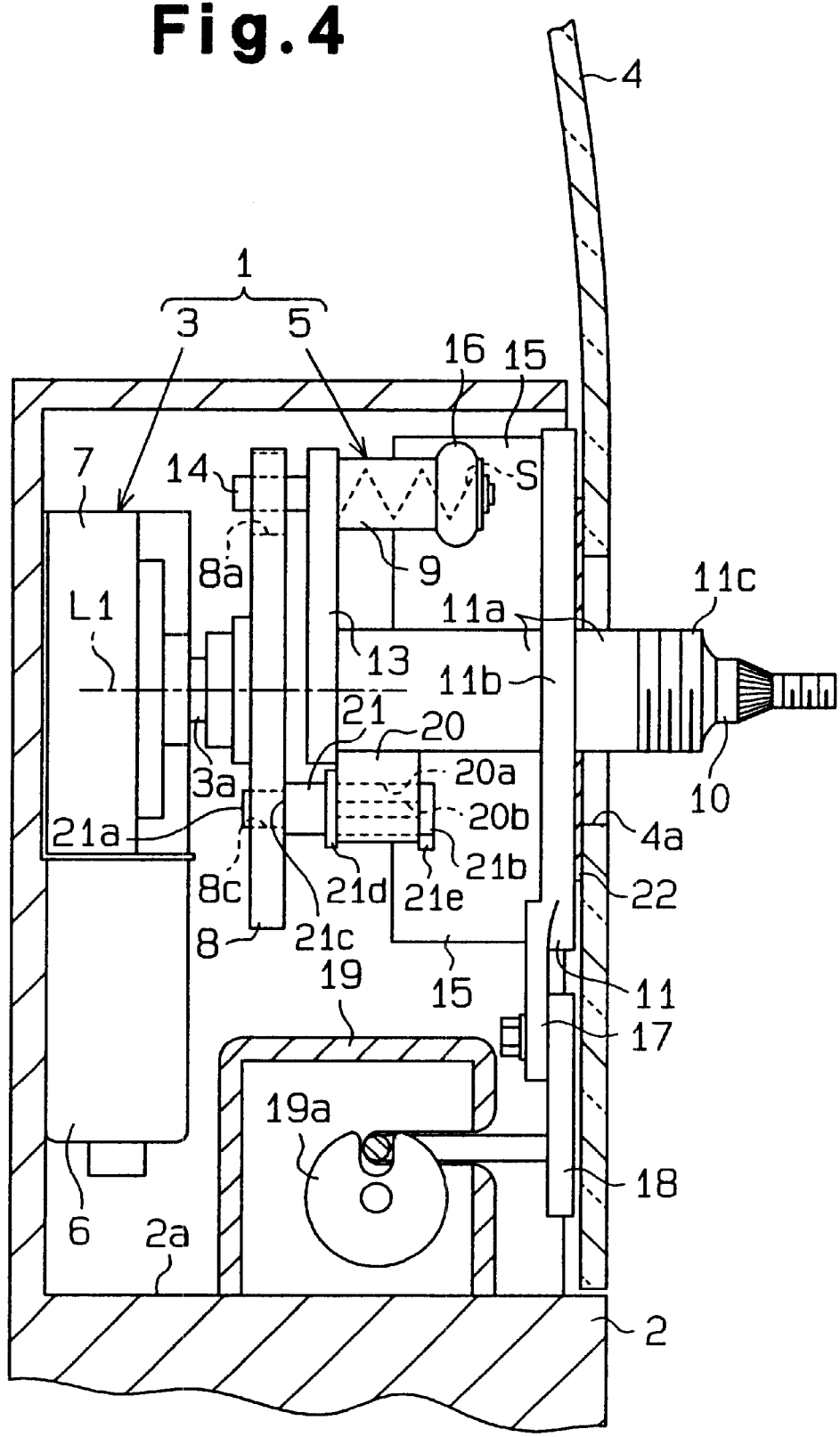
FIG. 4 is a cross-sectional view for illustrating the installation of the wiper device to the vehicle.

Next, as shown in FIG. 4, the rear window 4 is closed, and the cylinder 11a of the shaft holder 11 is placed in the installation hole 4a of the rear window. At this time, the packing 22 on the flange 11b contacts the interior surface of the rear window 4.

Figure 5:
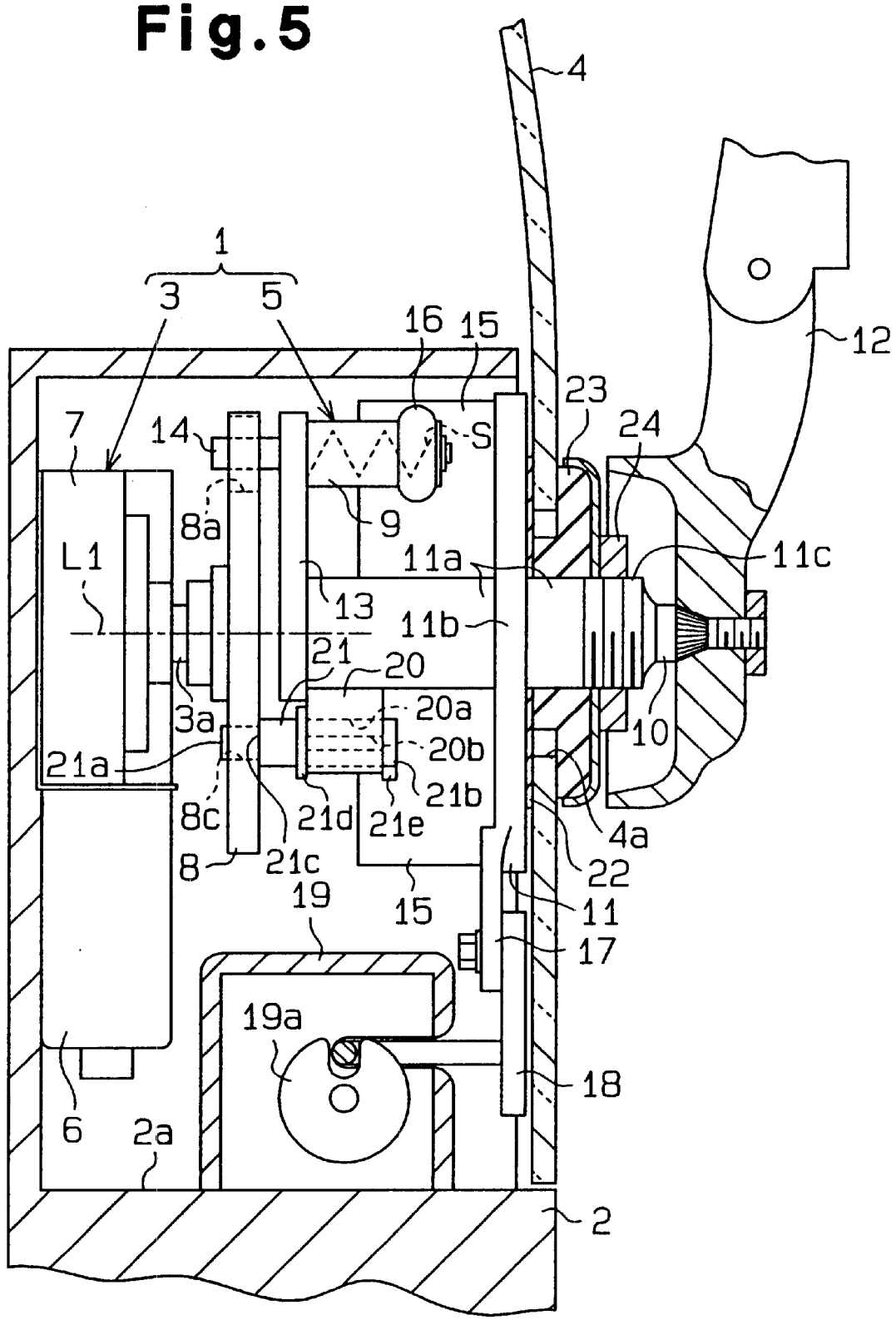
FIG. 5 is a cross-sectional view for illustrating the installation of the wiper device to the vehicle.

Next, as shown in FIG. 5, the outer bushing 23 is fitted on the cylinder 11a, and the nut 24 is fastened to the male thread 11c. As a result, the shaft holder 11 is fixed to the rear window 4. Then, the wiper arm 12 is positioned at the end of the pivoting range of the wiper arm 12 that corresponds to the initial position of the coupler hole 8a.

Figure 6:
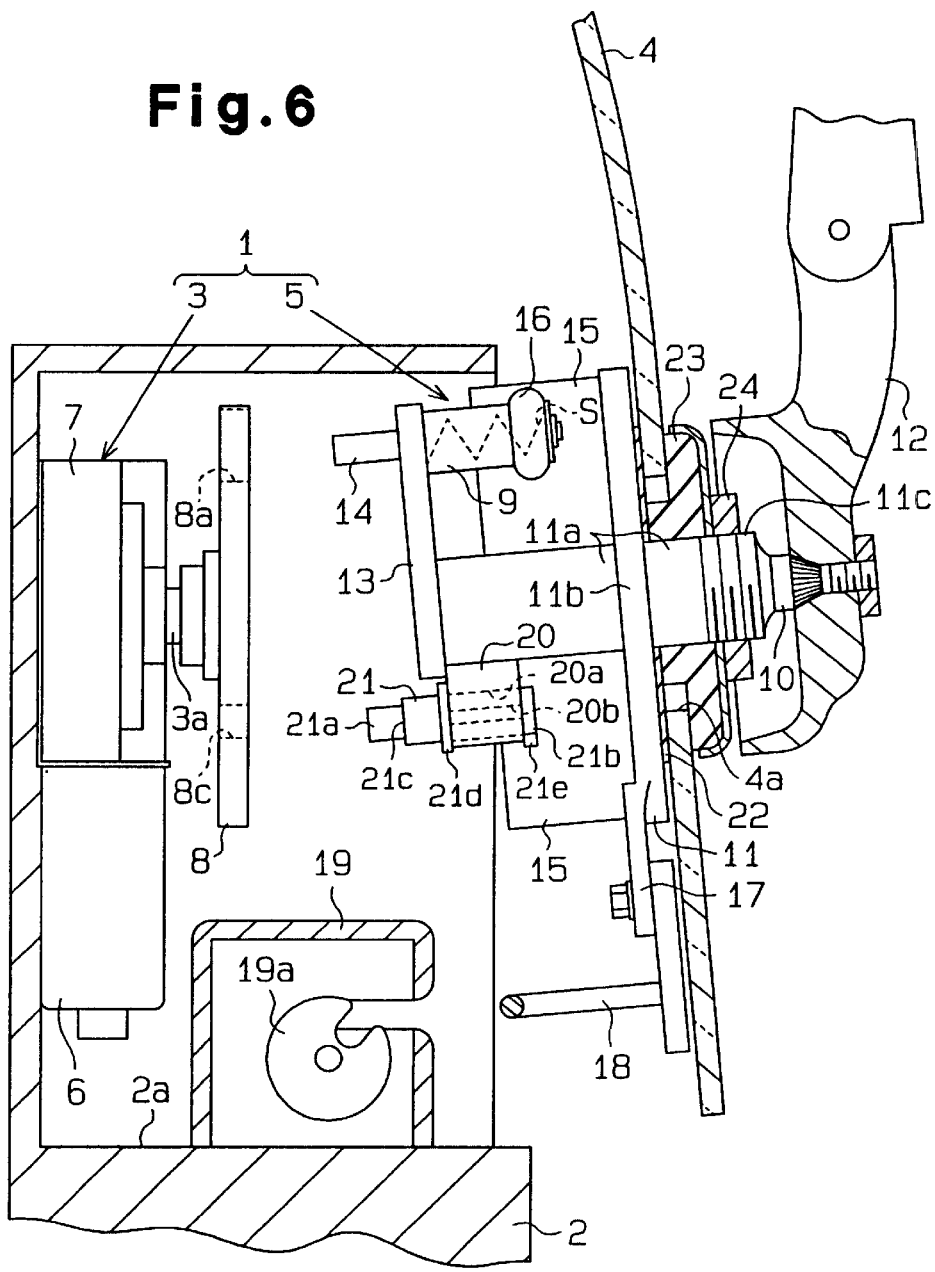
FIG. 6 is a cross-sectional view for illustrating the installation of the wiper device to the vehicle.

Next, as shown in FIG. 6, the rear window 4 is opened. Accompanying this, the positioning pin 21 come out of the front positioning hole 8c. Then, the positioning pin 21 is rotated to align the key 21e with the groove 20b, and the positioning pin 21 is removed from the positioning portion 20. In this way, the installation of the wiper device is completed.

As already described, in the present invention, prior to fixing the shaft holder 11 to the rear window 4, the shaft holder 11 is positioned and provisionally supported by the pivot disc 8 with the positioning pin 21 and the coupler pin 14 such that the axis of the pivot shaft 10 is aligned with the axis L1 of the output shaft 3a. The positioning pin 21, the coupler pin 14, the positioning holes 8c, 20a, and the coupler hole 8c serve as a positioning means (or a positioning mechanism) for determining the position of the shaft holder relative to the pivot disc 8 such that the axes of the shafts 10, 3a are aligned.

Accordingly, when the shaft holder 11 is fixed to the rear window 4, misalignment of the axes of the shafts 10, 3a is prevented. Therefore, unlike the prior art, there is no need to adjust the position of the shaft holder 11 or the actuator 3 during installation to prevent misalignment of the axes of the shafts 10, 3a. This facilitates installation of the wiper device 1. Also, since the axes of the shafts 10, 3a are accurately aligned, the wiper device operates smoothly, and the actual path of the wiper blade coincides with the predetermined path.

Misalignment of the shafts 10, 3a is prevented by providing the generally cylindrical positioning pin 21, the positioning holes 8c, 20a in the pivot disc 8 and the shaft holder 11. Also, the shapes of the positioning pin 21 and the positioning holes 8c, 20a are relatively simple. This simplifies the structure and facilitates manufacturing the wiper device 1.

The distance from the axis L1 to the front positioning hole 8c is less than that from the axis L1 to the coupler hole 8a. In other words, the path of the coupler hole 8a does not overlap the path of the front positioning hole 8c. Accordingly, the coupler pin 14 cannot be placed in the front positioning hole 8c, which prevents the wiper device 1 from malfunctioning. The distance from the axis L1 to the front positioning hole 8c may be greater than the distance from the axis L1 to the coupler hole 8a to achieve the same effect.

The positioning pin 21 is removed from the wiper device 1 after the shaft holder is fixed to the rear window 4. Accordingly, the positioning pin 21 does not cause any malfunction of the wiper device 1.

Figure 7A:
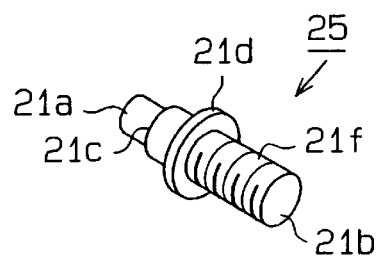
FIG. 7(a) is a perspective view showing another example of a positioning pin.
Figure 7B:
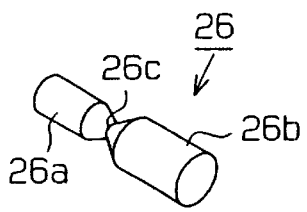
FIG. 7(b) is a perspective view showing another example of a positioning pin.

FIGS. 7(a) and 7(b) show variations of the positioning pin. In a positioning pin 25 shown in FIG. 7(a), a male thread 21f is formed on the surface of the second engagement shaft 21b of FIG. 3. In this case, the key 21e is not formed on the second engagement shaft 21b. A female thread corresponding to the male thread 21f is formed in the rear positioning hole 20a of FIG.3. In this case, the groove 20b is not formed in the rear positioning hole 20a.

When the wiper device 1 is installed, the male thread 21f is screwed into the rear positioning hole 20a. After installation of the wiper device 1, the male thread 21f is removed from the rear positioning hole 20a. The positioning pin 25 of FIG. 7(a) has the same advantages as the positioning pin 21 of FIG. 3.

A positioning pin 26 shown in FIG. 7(b) includes a front press fit shaft 26a, a rear press fit shaft 26b, and a breakable portion 26c located between the shafts 26a and 26b and having a small diameter. The front press fit shaft 26a is press fitted into the front positioning hole 8c, and the rear press fit shaft 26b is press fitted into the rear positioning hole 20a. The rear positioning hole 20a does not have the groove 20b in this variation.

When the wiper device 1 is installed, the press fit shafts 26a, 26b are fitted into the corresponding positioning holes 8c, 20a. After the installation of the wiper device 1, a force is applied to break the breakable portion 26c. The force is applied to the positioning pin 26, for example, by starting the wiper device 1. In this way, there is no need to remove the positioning pin 26 from the wiper device after installation.

Although the illustrated positioning pins 21, 25, 26 are generally cylindrical, their cross sectional shapes may be triangular, rectangular, or polygonal.

A plurality of positioning pins and corresponding positioning holes 8c, 20a may be used to prevent misalignment of the output shaft 3a and the pivot shaft 10. In this case, the shaft holder 11 is more firmly supported by the pivot disc 8, which more positively prevents misalignment during installation.

Figure 10:
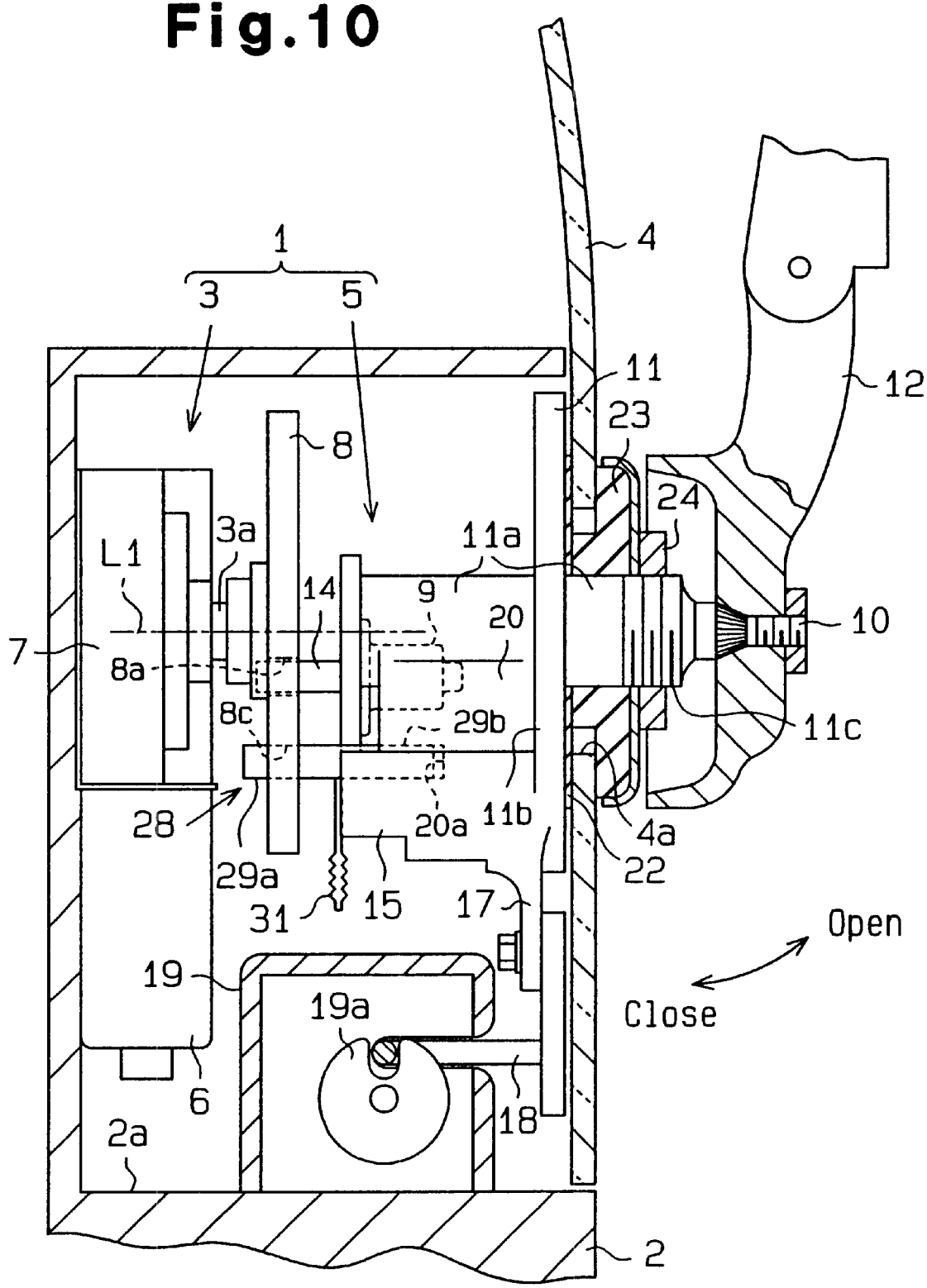
FIG. 10 is a cross-sectional view of the wiper device of FIG. 8.

A further embodiment will now be described with reference to FIGS. 8–10, and the description will focus on the differences from the embodiment of FIGS. 1–6. Parts similar to those of the embodiment of FIGS. 1–6 have the same reference numbers. In the embodiment of FIGS. 8–10, the regulators 15 of the shaft holder 11 abut against the crank lever 13. The abutment of the crank lever 13 against the regulators 15 limits the angular pivot range of the crank lever 13 (or the coupler pin 14).

A pair of front positioning holes 8c are formed in the pivot disc 8. As in the embodiment of FIGS. 1–6, the path of the front positioning holes 8c should not overlap the path of the coupler hole 8a. A pair of positioning portions 20 are formed on the front side (the side facing the pivot disk 8) of the shaft holder 11. As in the first embodiment, the positioning portions 20 have rear positioning holes 20a corresponding to the front positioning holes 8c. The rear positioning holes 20a do not have any grooves 20b.

A positioning jig 28 includes a pair of parallel pins 29, a coupler plate 30 connecting the parallel-pins 29, and a handle 31 extending from the middle of the coupler plate 30. The pins 29, the plate 30 and the handle 31 are integrally formed with resin to form the jig 28. The parallel pins 2.9 are equivalent to the positioning pin 21 of FIG. 3 and include front engagement shafts 29a, which fit into the corresponding front positioning holes 8c, and rear engagement shafts 29b, which fit into the corresponding rear positioning holes 20a. Slits 29c are formed in the engagement shafts 29a, 29b.

The slits make the engagement shafts radially flexible, which facilitates attaching and detaching the engagement shafts 29a, 29b with respect to the positioning holes 8c, 20a and prevents the engagement shafts 29a, 29b from being inadvertently moved in the positioning holes 8c, 20a.

The coupler plate 30 connects the parallel pins 29 at their middle parts. When the parallel pins 29 are fitted into the corresponding positioning holes 8c, 20a during the installation of the wiper device 1, the coupler plate 30 contacts the pivot disc 8 and the positioning portions 20. As a result, the shaft holder 11 is provisionally supported and accurately positioned with respect to the actuator 3 such that the axis of the pivot shaft 10 is aligned with the axis L1 of the output shaft 3a. At this time, the coupler pin 14 is located in the coupler hole 8a of the pivot disc 8. Therefore, the position of the shaft holder 11 relative to the actuator 3 is fixed at three locations.

The handle 31 is held by a worker when using the positioning jig 28. A serrated grip is formed on the distal end surface of the handle 31. The shape and material of the grip may be arbitrary selected as long as it achieves a desirable function. The handle 31 facilitates attaching and detaching the parallel pins 29 with respect to the positioning holes 8c, 20a.

When using the positioning jig 28 of the present embodiment, the installation procedure of the wiper device. 1 is substantially the same as that in the first embodiment-.There are two positioning holes 8c formed in the pivot disc 8, two positioning holes 20a formed on the shaft holder 11, and two pins 29 formed on the positioning jig 28. Therefore, compared with the first embodiment, the shaft holder 11 is more firmly supported by the pivot disk 8, which positively prevents misalignment of the shafts 3a, 10. Further, the handle 31 facilitates handling of the positioning jig 28. The handle 31 may be formed on the positioning pins 21, 25 of FIGS. 3 and 7(a).

Figure 11:
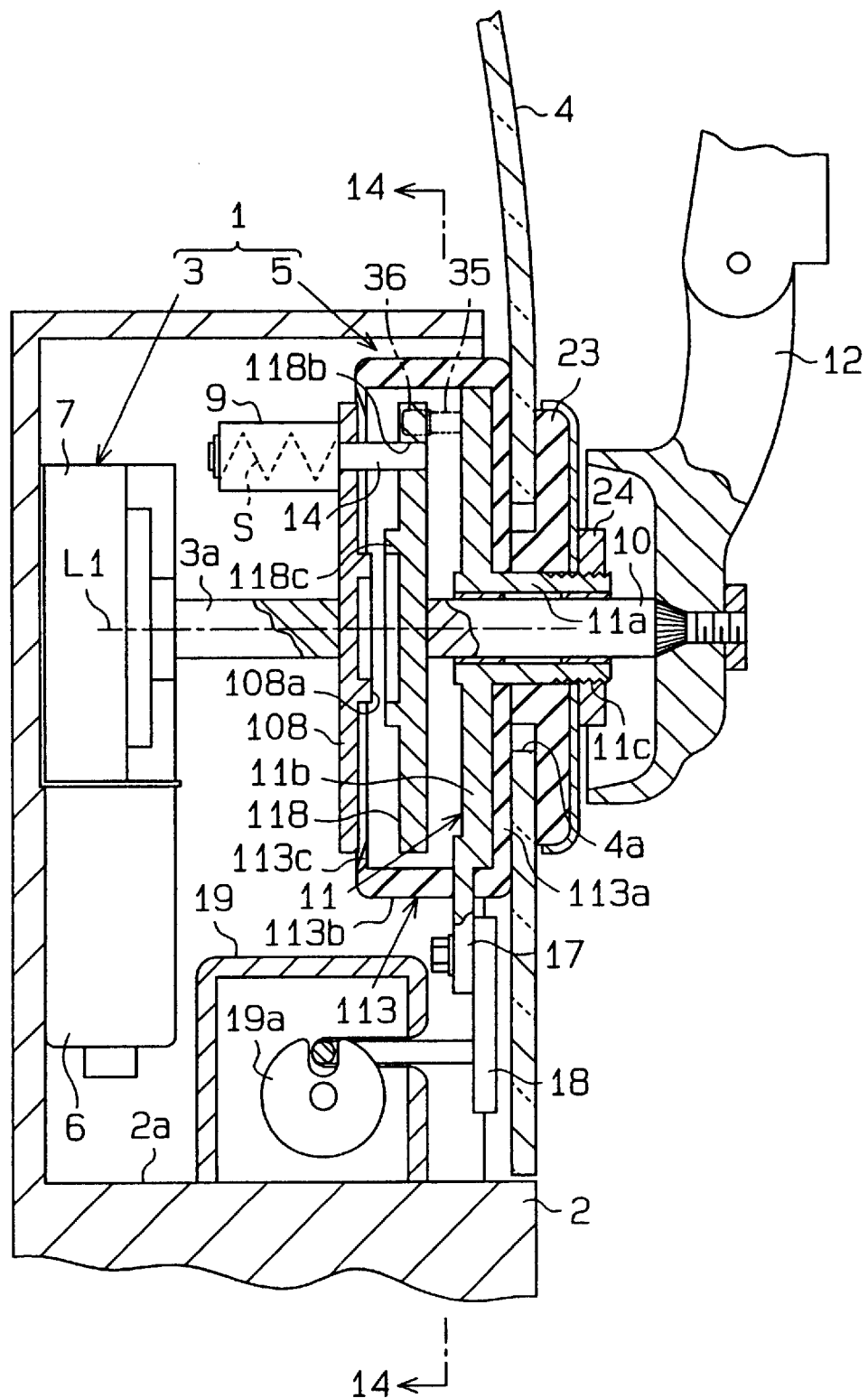
FIG. 11 is a cross-sectional view showing a wiper device according to a further embodiment of the present invention when a rear window is closed.
Figure 12:
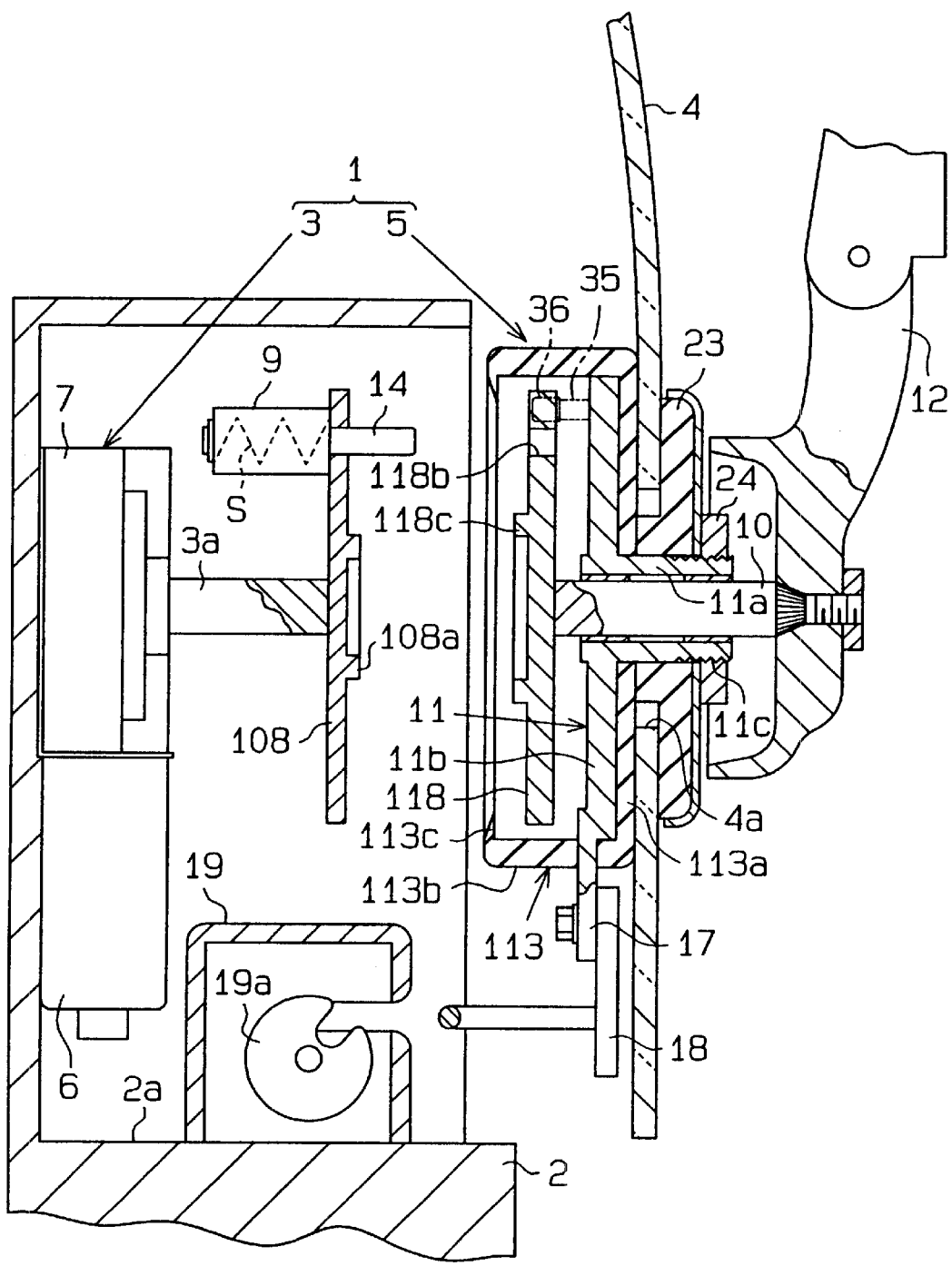
FIG. 12 is a cross-sectional view showing the wiper device of FIG. 11 when the rear window is opened.

A further embodiment will now be described with reference to FIGS. 11-14, and the description will focus on the differences from the first embodiment. Parts similar to those in the embodiment of FIGS. 1–6 have the same reference numbers. As shown in FIGS. 11 and 12, a front pivot disc 108, which is a first coupler, is fixed to the output shaft 3a of the actuator 3. The front pivot disc 108 is analogous to the pivot disc 8 of FIG. 1. Instead of the coupler hole, a pin holder 9 supports the coupler pin 14 in the front pivot disc 108. The angular pivot range of the front pivot disc 108, that is, the angular range of the coupler pin 14 is, for example, 165 degrees. When the wiper device 1 stops, the coupler pin 14 is at one end of the angular range (at the initial position) as shown in FIG. 14.

A front annular projection 108a is formed on the surface of the front pivot disc 108. The axis of the front annular projection 108a coincides with the axis L1 of the output shaft 3a.

A rear pivot disc 118, that is, a second coupler member, is fixed to the proximal end of the pivot shaft 10. A coupler hole 118b for receiving the coupler pin 14 is formed in the rear pivot disc 118. The first coupler member 108 includes the coupler pin 14 and the second coupler member includes the coupler hole 118b, which is opposite to the first embodiment.

A rear annular projection 118c is formed on the surface of the rear pivot disc 118. The rear annular projection 118c faces the front pivot disc 108. The rear annular projection 118c is coaxial with the pivot shaft 10. The inner diameter of the rear annular projection 118c is approximately the same as the outer diameter of the front annular projection 108a. When the wiper device 1 is installed, the front annular projection 108a fits in the rear annular projection 118c such that the pivot shaft 10 is coaxial with the output shaft 3a. The rear annular projection 118c defines an opening for receiving the front annular projection 108a.

A rubber packing 113 is attached to the flange 11b of the shaft holder 11. The packing 113 includes a disc 113a, a tubular portion 113b, and annular lip 113c. The disc 113a is fixed to the surface of the flange facing the rear window 4. The tubular portion 113b extends from the periphery of the disc 113a. The annular lip 113c extends from the front of the tubular portion 113b in a radially inward direction. The disc 113a is analogous to the packing 22 of FIG. 1. The packing 113 surrounds the flange 11b and the rear pivot disc 118. The inner diameter of the annular lip 113c is slightly smaller than the outer diameter of the front pivot disc 108.

Figure 13:
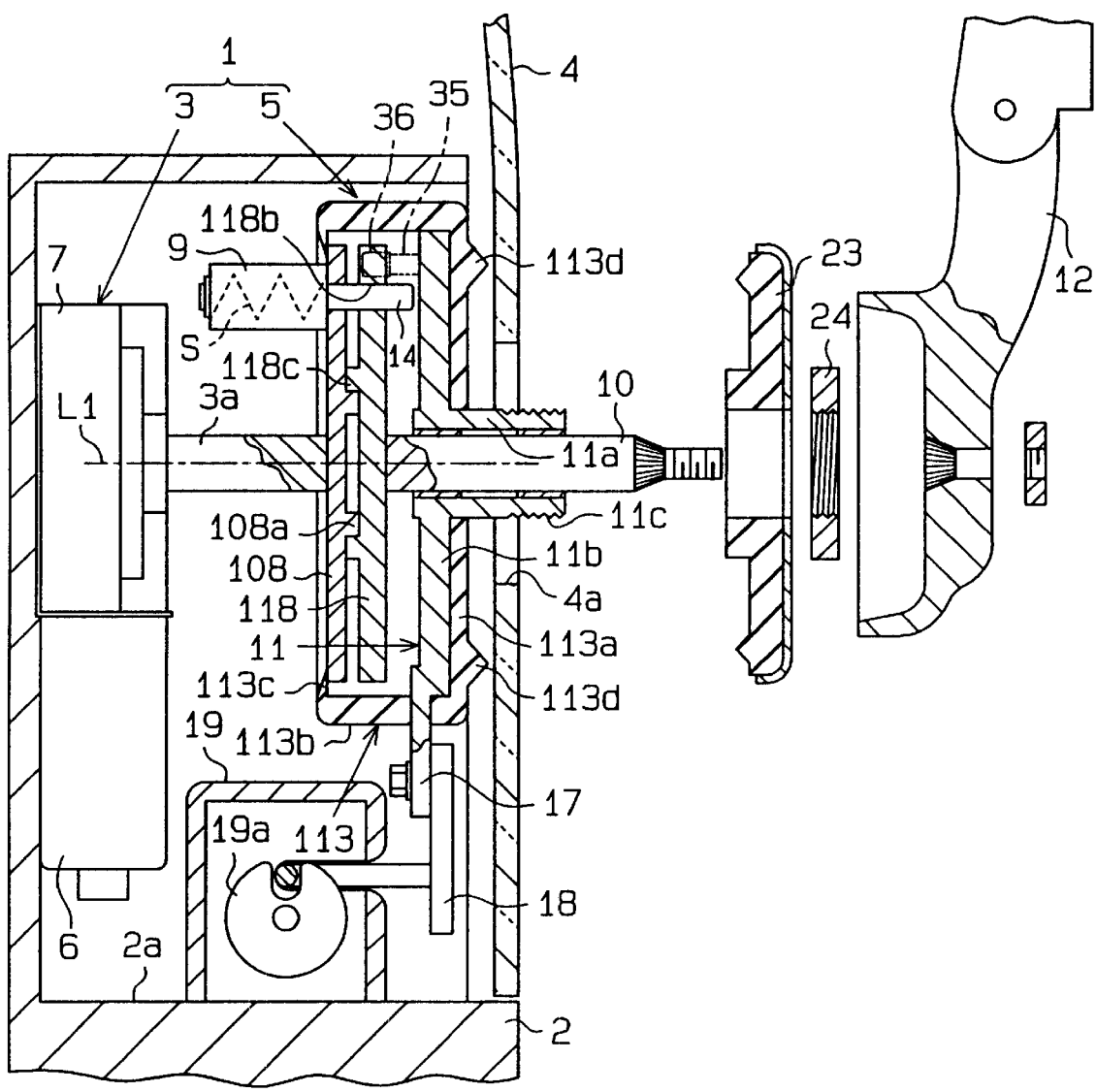
FIG. 13 is a cross-sectional view illustrating a procedure for installing the wiper device of FIG. 11.
Figure 14:
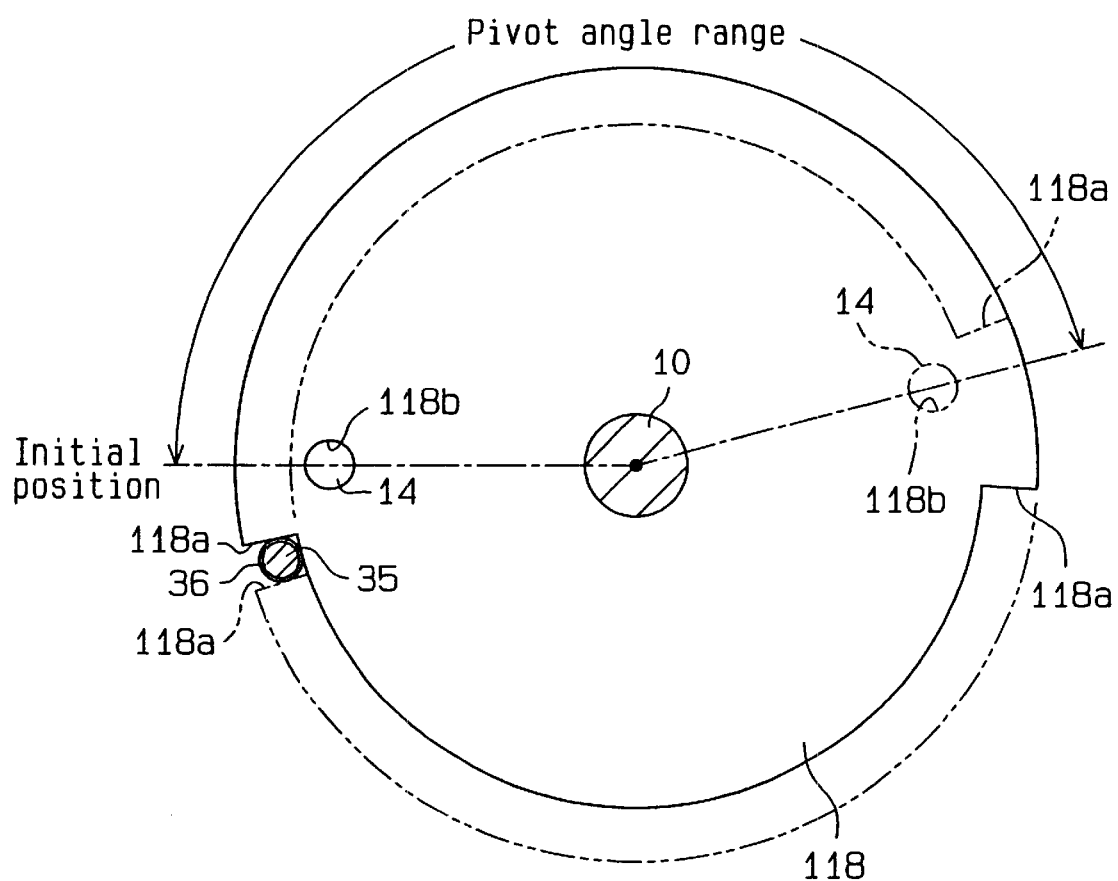
FIG. 14 is a cross-sectional view taken along the line 14—14 of FIG. 11.

As shown in FIG. 13, a plurality of projections 113d are formed on the rear surface of the packing 113. As shown in FIG. 11, when the transmission unit 5 is attached to the rear window 4, the projections 113d are pressed against the rear window 4 and are flattened.

A limit pin 35 is formed in the flange 11b of the shaft holder 11 and extends toward the rear pivot disc 118. A rubber cushion 36 is attached to the distal end of the limit pin 35. (see FIG. 14).

As shown in FIG. 14, part of the periphery of the rear pivot disc 118 is cut away, which forms a large diameter portion and a small diameter portion. Steps 118a are formed between the large diameter portion and the small diameter portion. The steps 118a abut against the cushion 36, which makes the angular pivot range of the rear pivot disc 118 substantially equal to that of the front pivot disc 108. The distance from the axis of the second pivoting disc 118 to the coupler hole 118b is less than the diameter of the small diameter portion of the rear pivot disc 118.

The wiper device 1 of the embodiment of FIGS. 1–14 has basically the same operation as the wiper device of FIGS. 1–6. That is, as shown in FIG. 11, when the rear window is closed and the coupler pin 14 of the front pivot disc 108 is placed in the coupler hole 118b of the rear pivot disc 118, the front pivot disc 108 is coupled to the rear pivot disc 118. When the actuator 3 is driven in this state, the wiper arm 12 pivots in an angular range corresponding to the angular pivot range of the pivot discs 108, 118.

In FIG. 11, the front pivot disc 108 is located outside the packing 113. The annular projections 108a, 118c of the pivot discs 108, 118 are not engaged and are spaced from one another.

When the rear window 4 is opened as shown in FIG. 12, the coupler hole disengages from the coupler hole 118b, which uncouples the pivot discs 108, 118.

When the rear window 4 is closed again, the coupler hole 118b may not be aligned with the coupler pin 14. In this case, the coupler pin 14 abuts against the surface of the rear pivot disc 118 and moves backward against the force of the spring S. If the wiper 1 is started in this state, the actuator 3 pivots the front pivot disc 108, which causes the coupler pin 14 to slide on the rear pivot disc 118. When the coupler pin 14 aligns with the coupler hole 118b, the coupler pin 14 enters the coupler hole 118b by the force of the spring S. Accordingly, the pivot discs 108, 118 are coupled.

Next, the procedure for installing the wiper device 1 will now be described with reference to FIG. 13. Prior to installing the wiper device 1, the transmission unit 5 is provisionally supported by the actuator 3. As shown in FIG.

13, the front pivot disc 108 is pressed into the packing 113 against the elastic force of the annular lip 113c of the front pivot disc 108. As a result, the front annular projection 108a is engaged with the rear annular projection 118c, which prevents the pivot disc 108 from moving relative to the pivot disc 118. The annular lip 113c engages the periphery of the front pivot disc 108 and positively retains the engagement of the annular projections 108a, 118c. The packing 113 having the annular lip 113c serves as a holding mechanism for resisting axial movement between the transmission unit 5 and the actuator 3.

At this time, the coupler pin is positioned at the initial position and is placed in the coupler hole 118b of the rear pivot disc 118 (see FIG. 14). Accordingly, rotation of the front pivot disc 108 relative to the rear pivot disc 118 is prevented. Also, as shown in FIG. 14, the rotational phase of the shaft holder with respect to the rear pivot disc 118 is determined such that the limit pin 35 contacts one of the steps 118a of the rear pivot disc 118.

As a result, the position of the shaft holder with respect to the actuator is accurately determined such that the pivot shaft 10 is coaxial with the output shaft 3a. In the embodiment of FIGS. 11–13, the annular projections 108a, 118c serve as a positioning means (or a positioning mechanism) for determining the position of the shaft holder relative to the actuator 3 to align the output shaft a with the pivot shaft 10.

Next, as shown in FIG. 13, the actuator 3 is fixed to the support 2a of the rear door 2 and the rear window 4 is closed. Then, the cylinder 11a of the shaft holder 11 is placed in the installation hole 4a of the rear window 4. At this time, the disc 113a of the packing 113 is spaced from the interior surface of the rear window 4. The projections 113d on the disc 113a do not contact the rear window 4.

Next, the outer bushing 23 is attached to the cylinder 11a, and the nut 24 is fastened on the male thread 11c. As the nut 24 is fastened, the transmission unit 5 moves toward the rear window 4. Then, the projections 113d of the packing 113 are pressed against the rear window 4, which retains the position of the transmission unit 5 relative to the rear window 4. Subsequently, the projections 113d are flattened, and the rear pivot disc 118 is separated from the front pivot disc 108. Accordingly, the rear annular projection 118c is disengaged from the front annular projection 108a. That is, the provisional support of the shaft holder by the actuator 3 is released. At this time, the front pivot disc 108 comes out from the packing 113 against the elastic force of the annular lip 113c.

When the projections 113d are completely flattened as shown in FIG. 11, the disc 113a of the packing 113 and the outer bushing 23 are pressed against the rear window 4. This fixes the shaft holder 11 to the rear window 4.

In this way, the projections 113d contact the rear window 4 when the shafts 3a, 10 are coaxial by the engagement of the annular projections 108a, 110c. In other words, the shaft holder 11 is fixed to the rear window 4 before the annular projections 108a, 118c are disengaged. Accordingly, misalignment of the shafts 3a, 10 is prevented when the shaft holder 11 is fixed to the rear window 4.

When the nut 24 is fastened, a force in the rotational direction of the nut 24 is applied to the shaft holder 11. However, the limit pin 35 contacts one of the steps 118a of the rear pivot disc 118, and the rear pivot disc 118 is coupled and fixed to the actuator 3 by the coupler pin 14. Therefore, the shaft holder 11 does not move with the nut 24 when the nut is fastened. Accordingly, the position of the shaft holder 11 about the axis is accurately determined.

Subsequently, the wiper arm 12 is fixed to the pivot shaft 10. At this time, the wiper arm 12 is arranged at one end of its pivoting range to correspond to the coupler pin 14 that is positioned at the initial position. In this way, the installation of the wiper device 1 is completed.

The present embodiment also has the same advantages as the embodiment of FIGS. 1–6. In addition, in the embodiment of FIG. 11, the special positioning jig used in the embodiment of FIGS. 1–6 is not necessary, which eliminates labor and simplifies assembly.

The provisional support of the shaft holder 11 by the actuator 3 is released by fastening the nut 24 to fix the shaft holder 11 to the rear window 4. Also, the projections 113d of the packing 113 contact the rear window 4 prior to the release of the provisional support, which prevents misalignment of the shafts 3a, 10. Therefore, the installation of the wiper device 1 is simple and accurate.

The deformation of the rubber lip 113c permits the first pivot disk 108 to engage and disengage the packing 113, and the lip 113c returns to its original shape.

Prior to the installation of the wiper device 1, the transmission unit 5 is provisionally supported by the actuator and is retained. This facilitates dealing with the parts.

Figure 15:
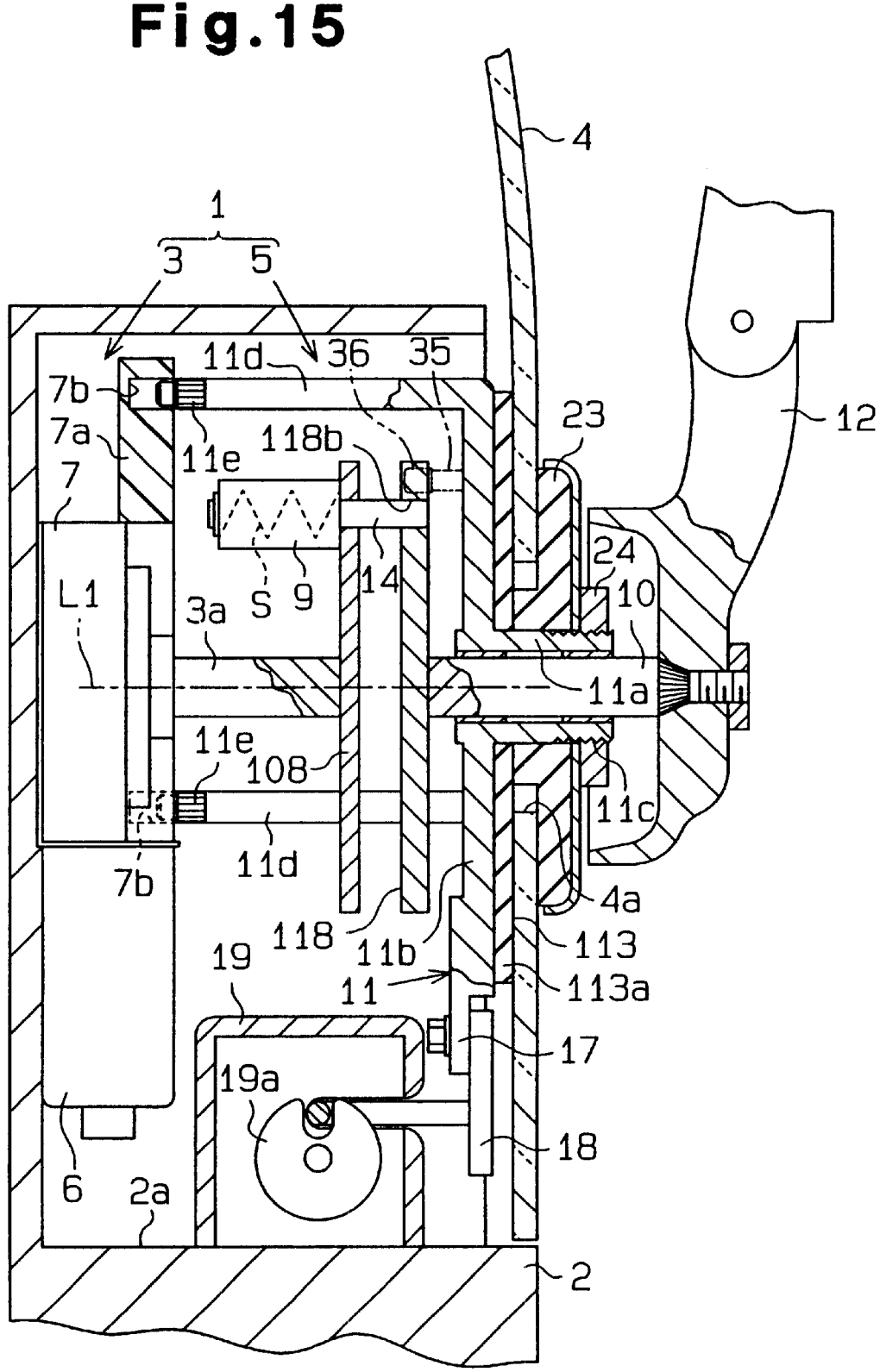
FIG. 15 is a cross-sectional view showing a wiper device according to a further embodiment of the present invention.
Figure 16:
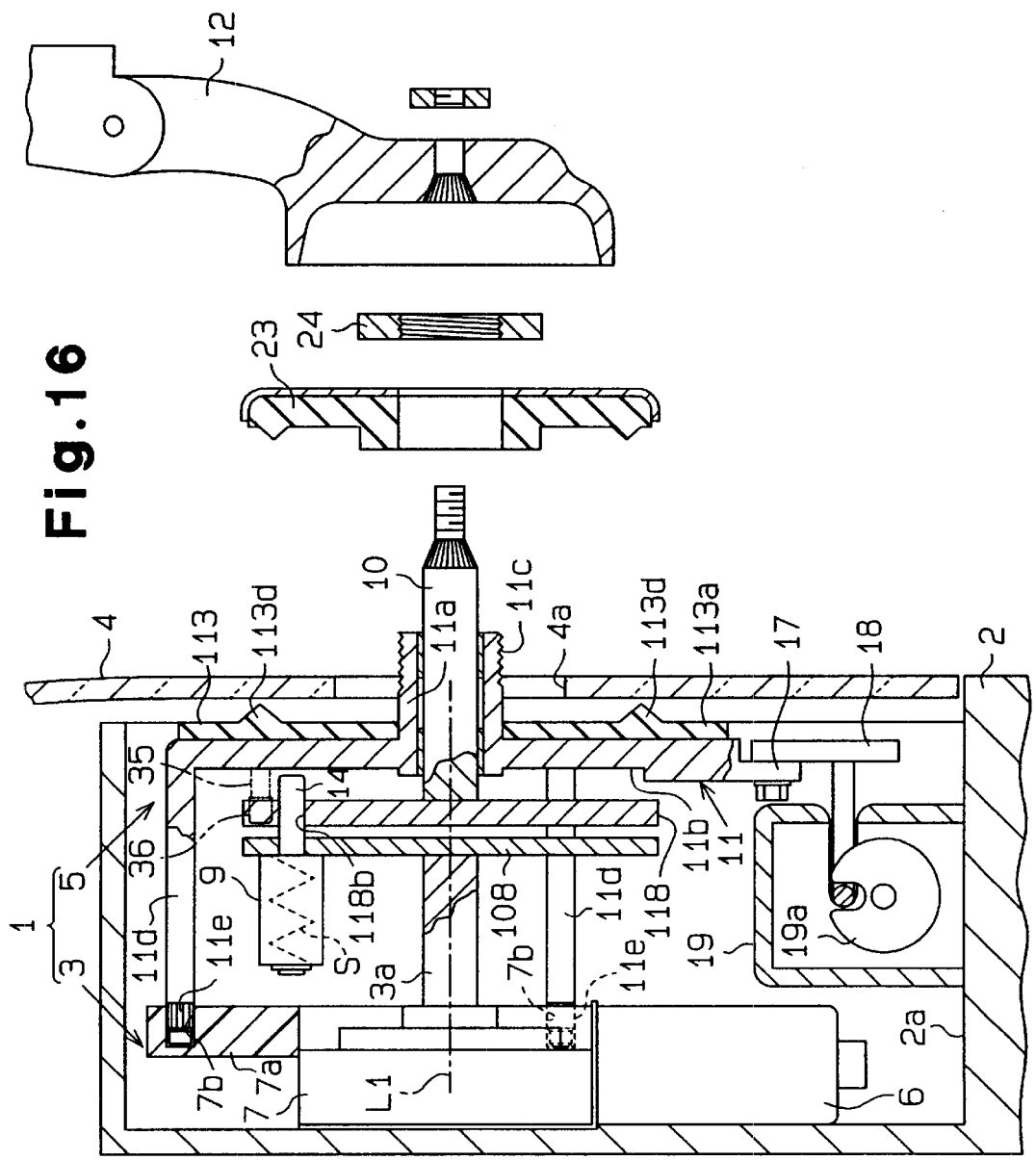
FIG. 16 is a cross-sectional view illustrating a procedure for installing the wiper device of FIG. 15.

A further embodiment of the present invention will now be described with reference to FIGS. 15 and 16, and the description will focus on the differences from the embodiment of FIGS. 11–14. Parts similar to those in the embodiment of FIGS. 11–14 have the same reference numbers. In the embodiment of FIGS. 15 and 16, the way of positioning and supporting the shaft holder 11 relative to the actuator 3 during the installation of the wiper device 1 is modified.

As shown in FIGS. 15 and 16, in the present invention, the front annular projection 108a is not formed on the front pivot disc 108, and the rear annular projection 118c is not formed on the rear pivot disc 118. The packing 113 includes only the disc 113a and the projections 113d. The tubular portion 113a and the annular lip 113c are omitted.

A resin positioning member 7a is formed on the speed reducer 7 of the actuator 3. The positioning member 7a extends radially outward from the peripheral surface of the speed reducer 7. The positioning member 7a includes two positioning recesses 7b, the openings of which face the transmission unit 5. The positioning recesses are spaced from one another by predetermined angular intervals about the axis L1 of the output shaft 3a. Alternatively, two positioning members 7a that respectively include the positioning recesses 7b may be arranged at the predetermined angular intervals.

Two positioning shafts 11d extend from the periphery of the flange 11b of the shaft holder 11 toward the positioning recesses 7b. Press fit portions 11e, which are fitted in the corresponding positioning recesses 7a, 7b, are formed at the distal ends of the positioning shafts 11d. The positioning shafts 11d and the positioning recesses 7b serve as a positioning means (or a positioning mechanism) for positioning the shaft holder 11 with respect to the actuator 3 such that the shafts 3a, 10 are coaxial when the wiper device 1 is installed.

As shown in FIG. 15, when the rear window 4 is closed after the installation of the wiper device 1, only the distal ends of the positioning shafts 11d are placed in the positioning recesses 7b. The diameter of the distal ends is smaller than that of the positioning recesses 7b, so the press fit portions 11e are not press fitted in the positioning recesses 7b. Alternatively, it may be that no part of the positioning shafts 11d is placed in the positioning recesses 7b when the rear window 4 is closed after the installation of the wiper device 1.

The parts of the present invention that are not described are the same as those of the embodiment of FIGS. 11–14. The operation of the wiper device 1 is also the same as that of the embodiment of FIGS. 11–14, and the description is omitted.

The procedure for installing the wiper device 1 will now be described with reference to FIG. 16. The transmission unit 5 is provisionally supported by the actuator 3 prior to the installation of the wiper device 1. The press fit portions 11e of the positioning shafts 11d are press fitted in the corresponding positioning recesses 7b. At this time, the coupler pin 14 is arranged at the initial position and is placed in the coupler hole 118b. Accordingly, relative movement of the pivot disc 108 with respect to the pivot shaft 118 is prevented. At this time, the limit pin 35 contacts one of the steps 118a of the second pivot disk 118 (see FIG. 14).

As a result, the position of the shaft holder 11 relative to the actuator is determined such that the pivot shaft 10 is coaxial with the output shaft 3a.

Next, as shown in FIG. 16, the actuator 3 is fixed to the support 2a of the rear door 2, and the rear window 4 is closed. Then, the cylinder 11a of the shaft holder 11 is placed in the installation hole 4a of the rear window 4. At this time, the projections 113d of the packing 113 are spaced from the rear window 4.

Next, the outer bushing 23 is fitted on the cylinder 11a, and the nut 24 is fastened to the male thread 11c. As the nut 24 is fastened, the transmission unit 5 moves toward the rear window 4. Then, the projections 113d of the packing 113 are pressed against the rear window 4, which fixes the position of the transmission unit 5 relative to the glass 4. Subsequently, the projections 113d are gradually flattened, and the press fit portions 11e come out of the positioning recesses 7b such that the press fit portions 11e are no longer press fitted. Accordingly, the provisional support of the shaft holder 11 by the actuator 3 is released.

In this way, the shaft holder 11 is fixed to and supported by the rear window 4 before the press fit portions 11e are released from the positioning recesses 7b. Accordingly, when the shaft holder 11 is fixed to the rear window 4, misalignment of the shafts 3a, 10 is prevented.

Also, the limit pin 35 contacts one of the steps 118a of the rear pivot disc 118. The shaft holder 11 is fixed and coupled to the actuator 3 through the positioning shafts 11d. This prevents the shaft holder 11 from moving with the nut 24 when the nut 24 is fastened.

When the projections 113d are completely flattened as shown in FIG. 15, the rear window 4 is pressed between the disc 113a and the outer bushing 23. As a result, the shaft holder 11 is fixed to the rear window 4. Subsequently, the wiper arm 12 is fixed to the pivot shaft 10, and the installation of the wiper device 1 is completed.

The present invention has the same advantages as the embodiment of FIGS. 11–14.

The number of the positioning shafts 11d and the positioning recesses 7b may be more than three. The positioning shafts 11d may extend from the actuator 3, and the positioning recesses may be formed in the shaft holder 11.

A further embodiment of the present invention will now be described with reference to FIGS. 17–20, and the description will focus on the differences from the embodiment of FIGS. 11–14. Parts similar to those in the embodiment of FIGS. 11–14 have the same reference numbers. In the embodiment of FIGS. 17–20, the structure for positioning and provisionally supporting the shaft holder 11 with respect to the actuator 3 during installation is different.

Figure 17:
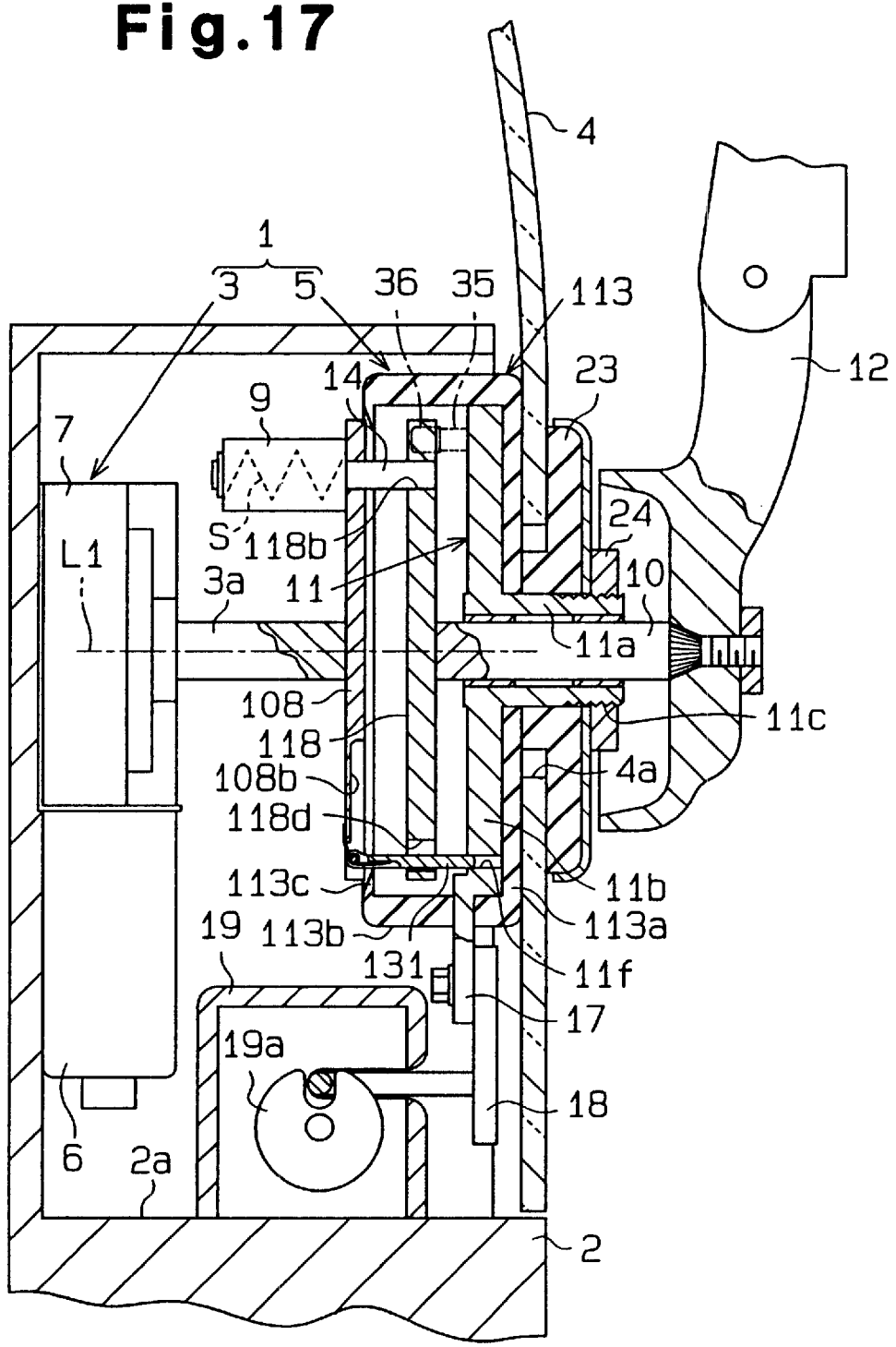
FIG. 17 is a cross-sectional view showing a wiper device according to a further embodiment of the present invention.
Figure 18:
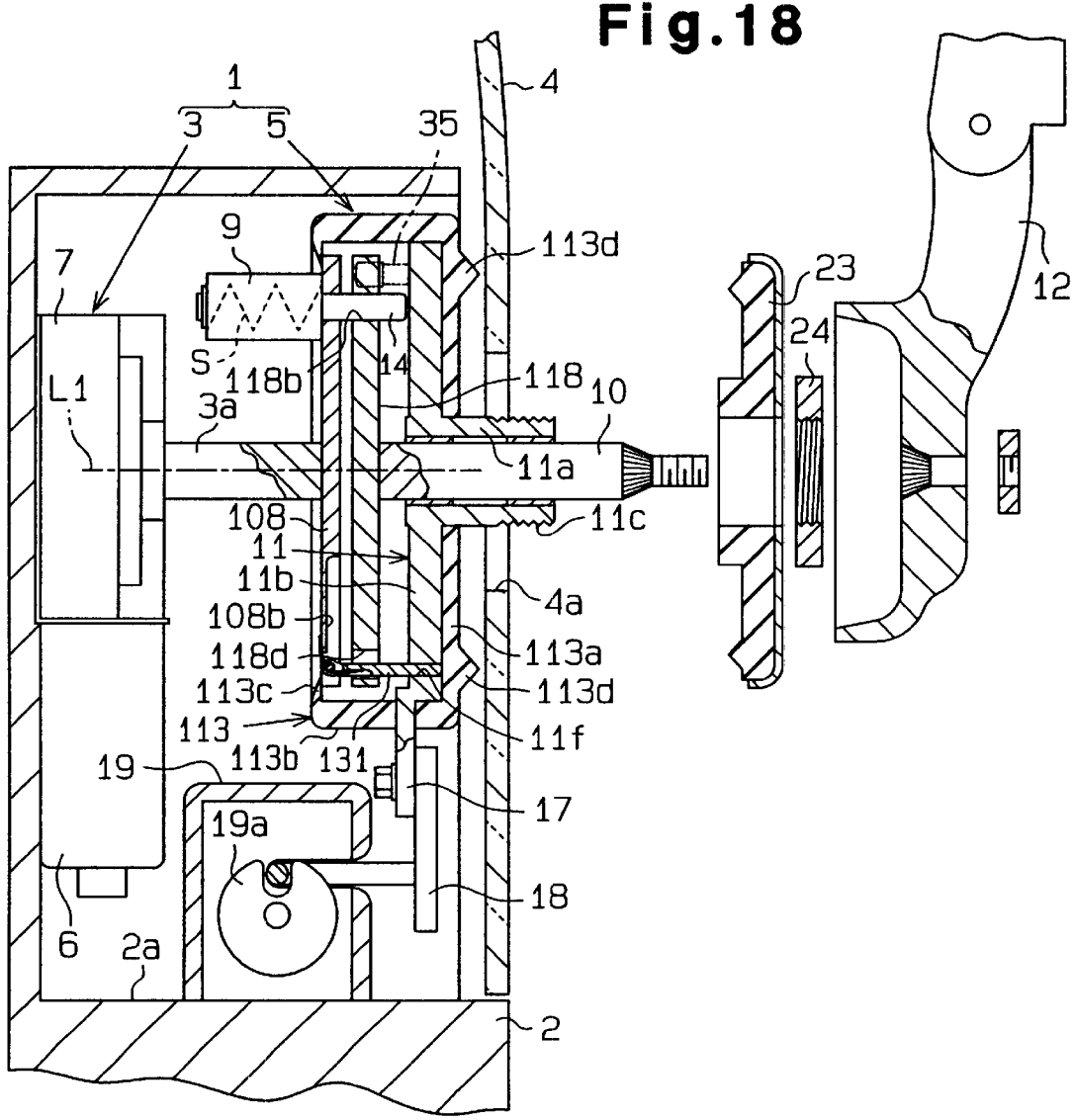
FIG. 18 is a cross-sectional view illustrating a procedure for installing the wiper device of FIG. 17.

As shown in FIGS. 17 and 18, in the present invention, the front annular projection 108a is not formed on the front pivot disc 108, and the rear annular projection 118c is not formed on the rear pivot disc 118.

A through hole 118d is formed in the rear pivot disc 118. The through hole is formed, for example, 180 degrees from the coupler hole 118b. The distance from the axis of the rear pivot disc 118 to the through hole 118d is greater than the distance from the axis of the rear pivot disc 118 to the coupler hole 118b. Accordingly, the path of the of the coupler hole 118b does not overlap the path of the through hole 118d.

A positioning hole 11f is formed in the flange 11b of the shaft holder 11. The positioning hole 11f is parallel to the axis of the pivot shaft 10. When the coupler pin 14, which is at the initial position, is placed in the coupler hole 118b and the limit pin 35 contacts one of the steps 118a of the rear pivot disc 118 (see FIG. 14), the positioning hole 11f is aligned with the through hole 118d.

Figure 19:
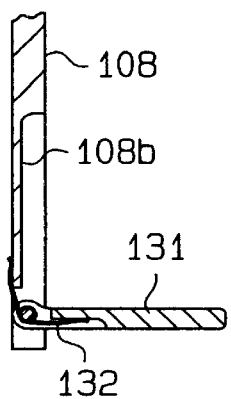
FIG. 19 is a partial enlarged cross-sectional view showing a positioning pin arranged at the unfolded position.
Figure 20:
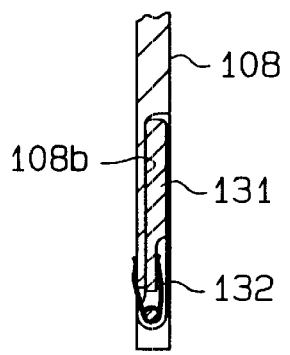
FIG. 20 is a partial enlarged cross-sectional view showing a positioning pin arranged at the folded position.

A groove 108b extends radially in the rear surface of the front pivot disc 108. The groove 108b is located, for example, 180-degrees from the coupler pin 14 about the axis L1. The positioning pin 131 is located in the groove 108b and is pivotally supported by the front pivot disc 108. As shown in FIGS. 19 and 20, the positioning pin 131 pivots between a folded position and unfolded position. The positioning pin 131 is accommodated in the groove 108b at the folded position and is parallel to the axis L1 of the output shaft 3a at the unfolded position. A spring 132 urges the positioning pin 131 counterclockwise (as viewed in FIGS. 19 and 20) to return the positioning pin 131 to the groove 108b.

As shown in FIGS. 17 and 18, when the positioning hole 11f is aligned with the through hole 118d and the positioning pin 131 is extended, the positioning pin 131 is fitted in the positioning hole 11f by way of the through hole 118d. The coupler pin 14, the coupler hole 118b, the positioning pin 131, and the positioning hole 11f serve as a positioning means (or a positioning mechanism).

The procedure for installing the wiper device 1 will now be described. First, the positioning hole 11f is aligned with the through hole 118d and the positioning pin 131 is extended. In this state, the front pivot disc 108 is engaged with the packing 113 against the elastic force of the annular lip 113c. Then, the positioning pin 131 is fitted in the positioning hole 11f and the coupler pin 14 is received in the coupler hole 118b. As a result, the shaft holder 11 is accurately positioned relative to the actuator 3 such that the pivot shaft 10 is coaxial with the output shaft 3a.

Next, as shown in FIG. 18, the actuator 3 is fixed to the support 2a of the rear door 2, and the rear window 4 is closed. Then, the cylinder 11a of the shaft holder 11 is placed in the installation hole 4a of the rear window 4. At this time, the projections 113d of the packing 113 are spaced from the rear window 4.

Next, the outer bushing 23 is fitted on the cylinder 11a, and the nut 24 is fastened on the male thread 11c. As the nut 24 is fastened, the projections 113d of the packing 113 are gradually pressed against and flattened on the interior surface of the rear window 4. Also, the front pivot disc 108 disengages with the packing 113 against the elastic force of the annular lip 113c. When the projections 113d are completely flattened as shown in FIG. 17, the rear window 4 is pressed between the disc 113a of the packing 113 and the outer bushing 23. As a result, the shaft holder 11 is fixed to the rear window 4. Subsequently, the wiper arm 12 is fixed to the pivot shaft 10 and the installation of the wiper device 1 is completed.

In this way, the shaft holder 11 is fixed to the rear window 4 when the positioning pin 131 is fitted in the positioning hole 11f and the coupler pin 14 is received in the coupler hole 118b. Accordingly, misalignment of the shafts 3a, 10 is prevented when the shaft holder 11 is fixed to the rear window 4.

Also, the limit pin 35 contacts one of the steps 118a of the rear pivot disc 118. The shaft holder 11 is fixed to and coupled to the front pivot disc 108 through the positioning pin 131. This prevents the shaft holder 11 from moving with the nut 24 when the nut 24 is fastened.

After the installation of the wiper device 1, the rear window 4 is opened (see FIG. 12). Then the positioning pin 131 is removed from the through hole 118d and the positioning hole 11f, and the coupler pin 14 is removed from the coupler hole 118b. As a result, the positioning pin 131 is pivoted by the force of the spring 132 to the folded position shown in FIG. 20 and is accommodated in the groove 108b. Accordingly, a worker does not need to fold the positioning pin 131, and the wiper device 1 will operate normally.

The present embodiment has the same advantages as the embodiment of FIGS. 11–14. Pivoting the positioning pin 131 manually without using the spring 132 is within the scope of the present invention.

A further embodiment of the present invention will now be described with reference to FIGS. 21–24, and the description will focus on the differences from the embodiment of FIGS. 17–20. Parts similar to those in the embodiment of FIGS. 17–20 have the same reference numbers.

Figure 21:
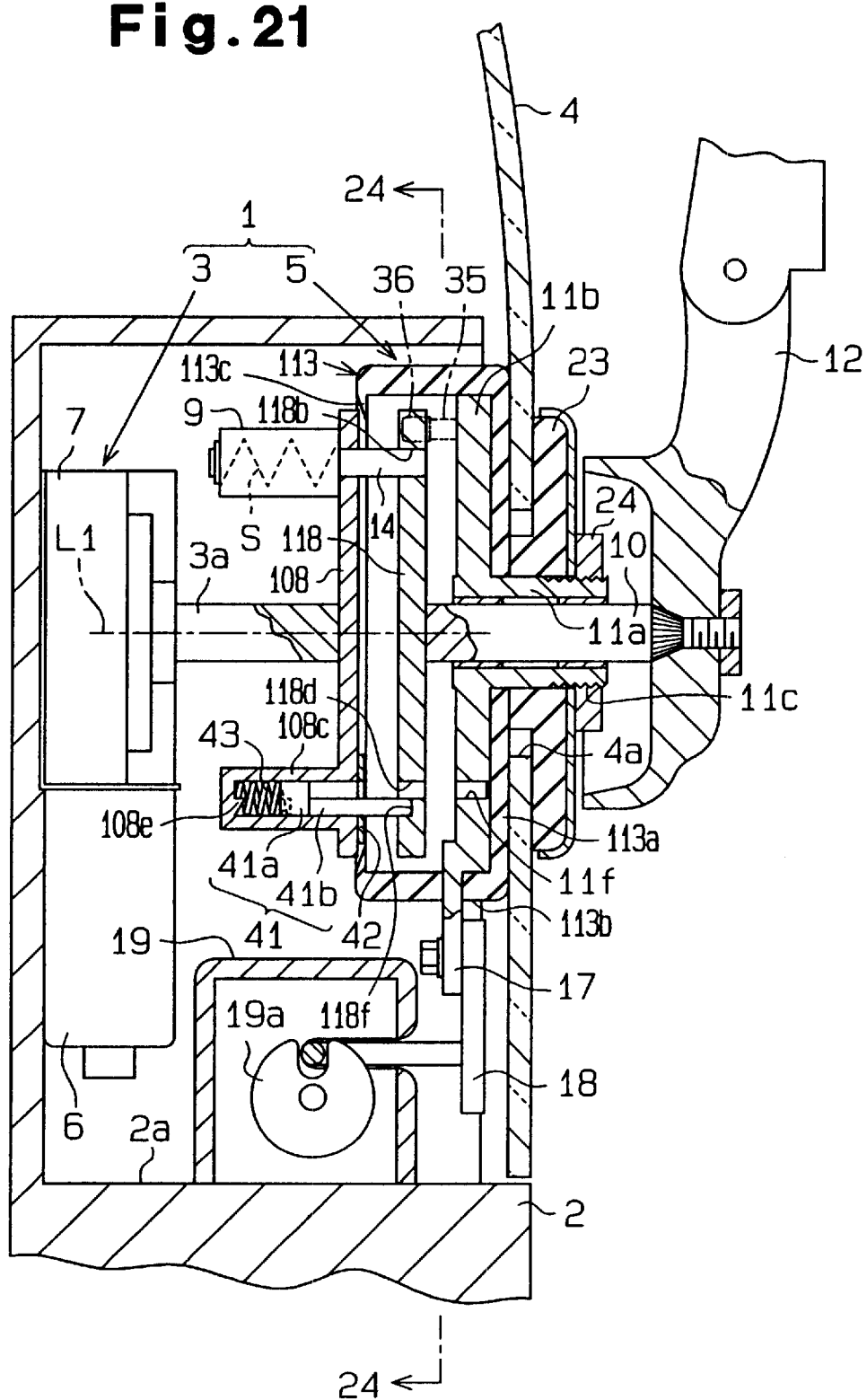
FIG. 21 is a cross-sectional view showing a wiper device according to a further embodiment of the present invention.
Figure 22:
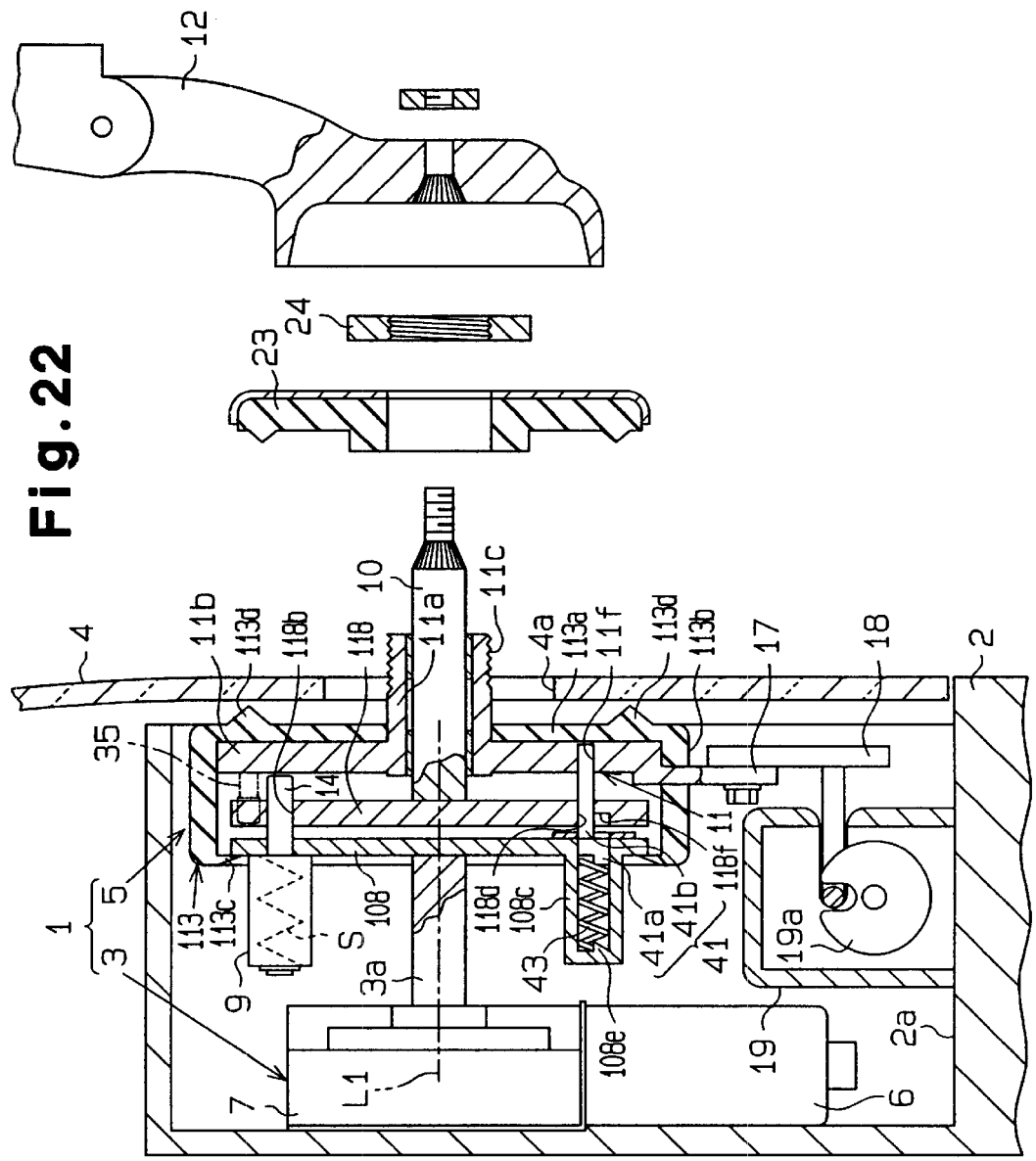
FIG. 22 is a cross-sectional view illustrating a procedure for installing the wiper device of FIG. 21.

In the embodiment of FIGS. 17–20, the positioning pin 131 pivots between the unfolded position and the folded position. In the embodiment of FIGS. 21–24, a positioning pin 41 is not foldable as shown in FIGS. 21 and 22. The positioning pin 41 can move axially. The positioning pin 41 also moves in a plane perpendicular to the axis of the pin 41 between a position engaging the positioning hole 11f and a position not engaging the positioning hole 11f.

As shown in FIGS. 21–24, a recess 118f connected to the through hole 118d is formed on the surface of the rear pivot disc 118. The recess 118f, which is arcuate, extends radially outward from the through hole 118d.

Figure 24:
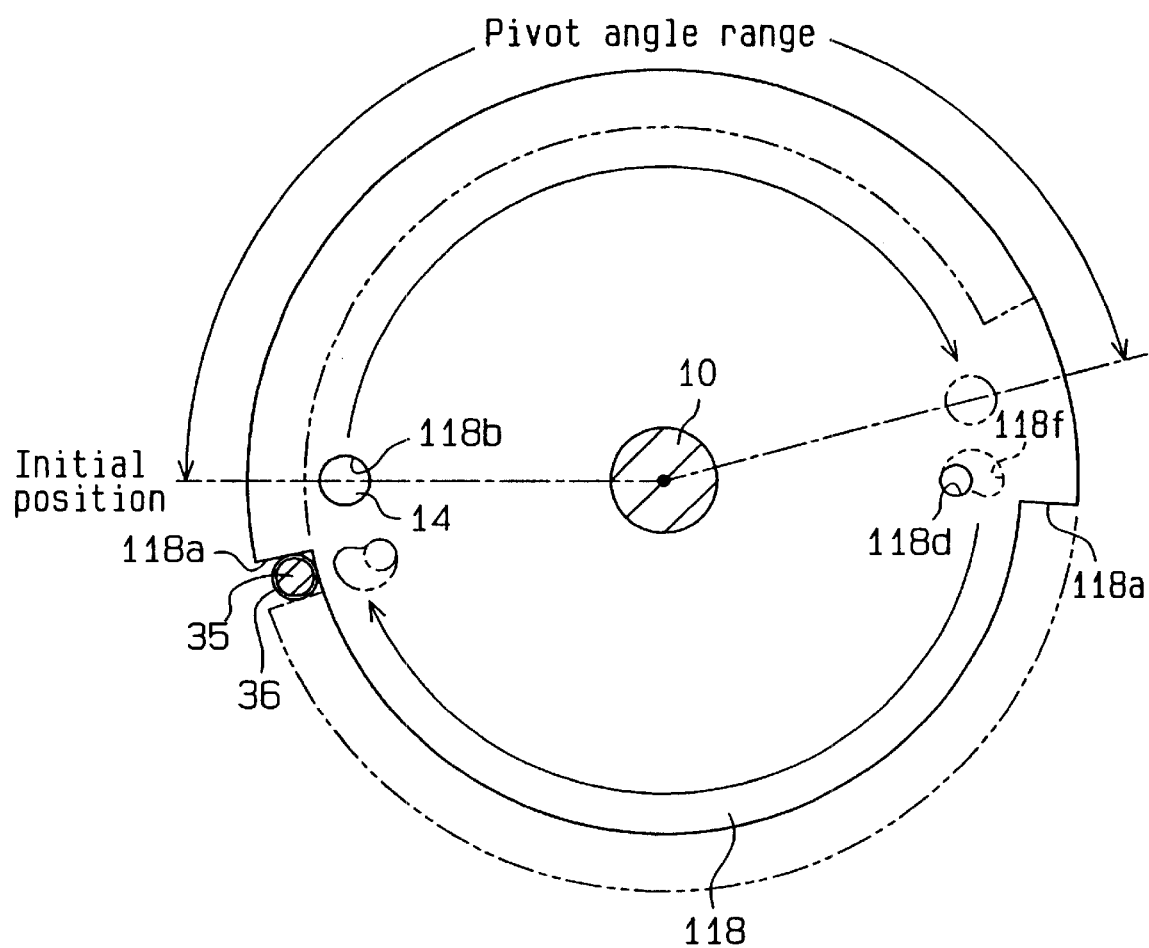
FIG. 24 is a cross-sectional view taken along the line 24—24 of FIG. 21.

As shown in FIG. 24, the through hole 118d and the recess 118f are arranged 180-degrees from the coupler hole 118b about the axis of the rear pivot disc 118. The distance from the axis of the rear pivot disc 118 to the through hole 118d is substantially the same as the distance from the axis of the rear pivot disc 118 to the coupler hole 118b. However, as shown in FIG. 24, since the angular pivot range of the coupler hole 118b is less than 180 degrees, the path of the coupler hole 118b does not overlap the path of the recess 118f.

Figure 23:
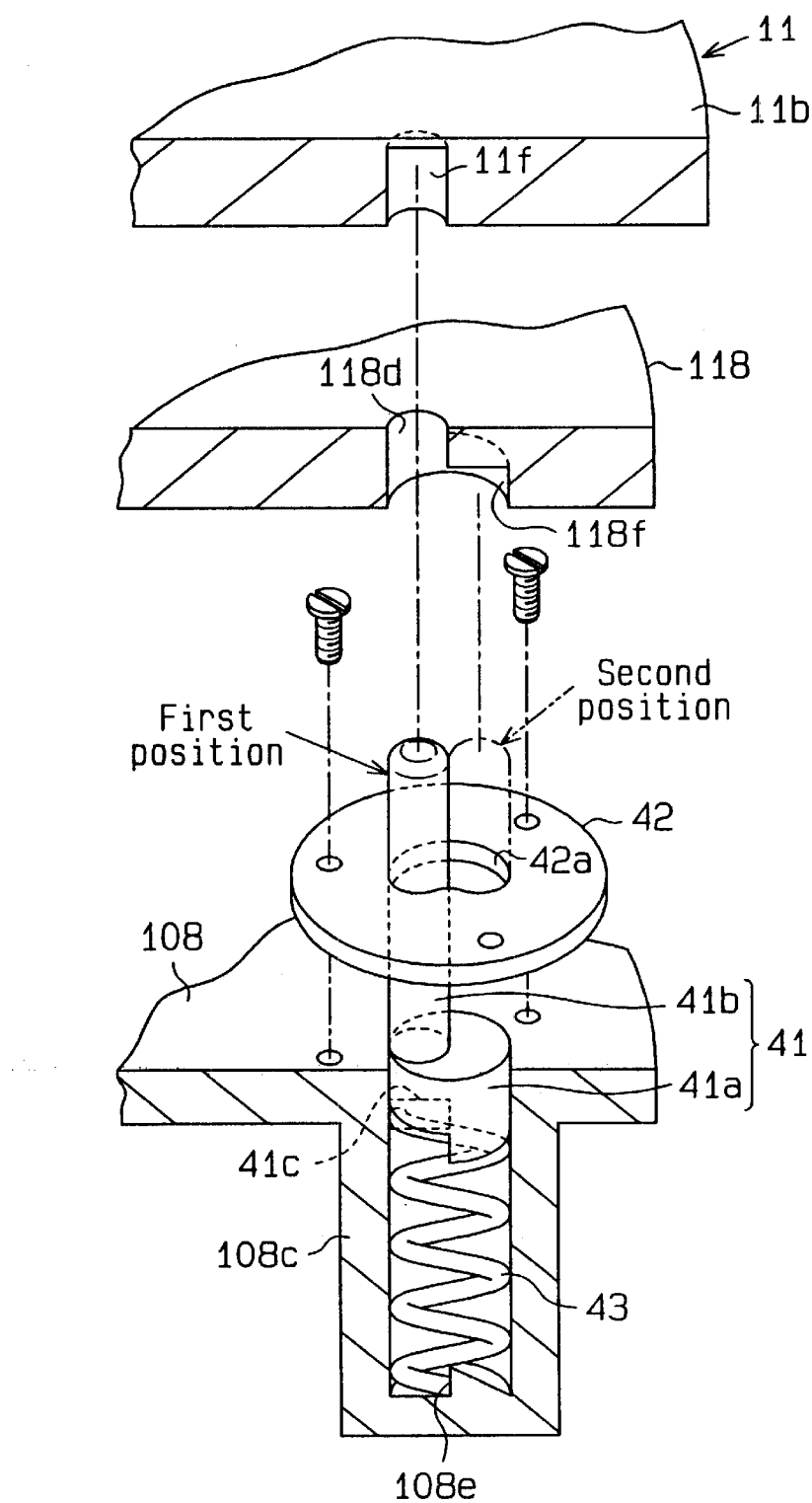
FIG. 23 is a partial enlarged cross-sectional view mainly showing a positioning pin.

As shown in FIGS. 21–23, the positioning hole 11f is formed in the flange 11b of the shaft holder 11 as in the embodiment of FIGS. 17–20. When the coupler pin 14, which is at the initial position, is placed in the coupler hole 118b and the limit pin 35 contacts one of the steps 118a of the rear pivot disc 118 (see FIG. 24), the positioning hole 11f is aligned with the through hole 118d. In the present embodiment, the diameter of the through hole 118d is substantially the same as the diameter of the positioning hole 11f. The positioning pin 41 is snugly fitted in the through hole 118d.

As shown in FIGS. 21–23, the positioning pin 41 is supported by the front pivot disc 108 to extend toward the rear pivot disc 118. The cylinder 108c for supporting the positioning pin 41 is formed in the front pivot disc 108. The cylinder 108c is arranged, for example, 180-degrees from the coupler pin 14 about the axis L1.

As shown in FIG. 23, the positioning pin 41 includes a base 41a and an engagement shaft 41b. The base 41a is accommodated in the cylinder 108c, and the engagement shaft 41b extends from the base 41a toward the rear pivot disc 118. The base 41a is supported by the cylinder 108c to move axially and to rotate about an axis. The engagement shaft 41b is eccentric from the base 41a and is parallel to the axis L1 of the output shaft 3a. The diameter of the engagement shaft 41b is about one half of that of the base 41a.

The coil spring 43 is accommodated in the cylinder 108c between the inner bottom of the cylinder 108c and the base 41a. The coil spring 43 urges the positioning pin 41 out of the cylinder 108c. A stopper projection 108e is formed in the bottom of the cylinder 108c, and a stopper projection 41c is formed on the bottom of the base 41a. The ends of the coil spring 43 engage the corresponding stopper projections 108e, 41c.

A plate 42 is fixed to the front pivot disc 108 by a screw to close the opening of the cylinder 108c. The plate 42 includes an arcuate guide hole 42a, which permits the passage of the engagement shaft 41b. The shape of the guide hole 42a corresponds to the path of the engagement shaft 41b when the base 41a rotates in the cylinder 108c. When the coupler pin 14 is placed in the coupler hole 118d of the rear pivot disc 118, the guide hole 42a is aligned with the through hole 118d and the recess 118f of the rear pivot disc 118.

The coil spring 43 produces a torsion force. The torsion force urges the base 41a to rotate clockwise (from the viewpoint of FIG. 23). Accordingly, as shown by a broken line in FIG. 23, the engagement shaft 41b is normally retained at the clockwise end (the second position) of the guide hole 42a. The engagement shaft 41b can be moved to the opposite end of the guide hole 42a (the first position, see FIG. 23) against the torsion force. When the engagement shaft 41b is positioned at the first position, the engagement shaft 41b engages the through hole 118d and the positioning hole 11f. When the engagement shaft 41b is positioned at the second position, the engagement shaft 41b is not aligned with the through hole 118d but is aligned with the recess 118f.

The coupler pin 14, the coupler hole 118b, the positioning pin 41, the through hole 118d, and the positioning hole 11f serve as a positioning means (or a positioning mechanism).

The procedure for installing the above wiper 1 to the vehicle will now be described. First, the positioning hole 11f is aligned with the through hole 118d, the positioning pin 41 is positioned at the first position shown in FIG. 23, and the front pivot disc 108 is engaged with the packing 113 against the elastic force of the annular lip 113c. Then, the positioning pin 41 is fitted in the through hole 118d and the positioning hole 11f, and the coupler pin 14 is fitted in the coupler hole 118b. As a result, the shaft holder 11 is accurately positioned relative to the actuator 3 such that the pivot shaft 10 is coaxial with the output shaft 3a.

Next, as shown in FIG. 22, the actuator 3 is fixed to the support 2a of the rear door 22 and the rear window 4 is closed. Subsequently, the outer bushing 23 is fitted on the cylinder 11a, and the nut 24 is fastened to the male thread 11c. As a result, the shaft holder 11 is fixed to the rear window 4 and the pivot shaft 10 is coaxial with the output shaft 3a as in the embodiment of FIGS. 17–20.

In this way, the shaft holder 11 is fixed to the rear window 4 when the positioning pin 41 is fitted in the through hole 118d and the positioning hole 11f and the coupler pin 14 is fitted in the coupler hole 118b. Accordingly, misalignment of the shafts 3a, 10 is prevented when the shaft holder 11 is fixed to the rear window 4.

After the installation of the wiper device 1, the rear window 4 is opened. Then, the positioning pin 41 comes out of the through hole 118d and the positioning hole 11f, and the coupler pin 41 comes out from the coupler hole 118b. As a result, the positioning pin 41 is moved to the second position shown in FIG. 23 by the torsion force of the coil spring 43. The positioning pin 41 retains the second position and is not aligned with the through hole 118d. Accordingly, a worker does not have to move the positioning pin 41. It is considered to be within the scope of the present invention that the worker manually moves the positioning pin 41 between the first position and the second position without relying-on the torsion force of the coil spring 43.

When the rear window 4 is closed as shown in FIG. 21, the positioning pin 41 enters the recess 118f and does not pass through the through hole 118d. The positioning pin 41 contacts the bottom of the recess 118f and is retracted in the cylinder 108c. Accordingly, the wiper device 1 operates normally.

The embodiment of FIG. 21 has the same advantages as the embodiment of FIGS. 17–20.

The coil spring 43 has the functions of urging the positioning pin 41 axially and of urging the positioning pin 41 tortionally from the first position toward the second position. That is, only one member is necessary to urge the positioning pin 41 in two different directions. This reduces the number of parts.

Figure 25:
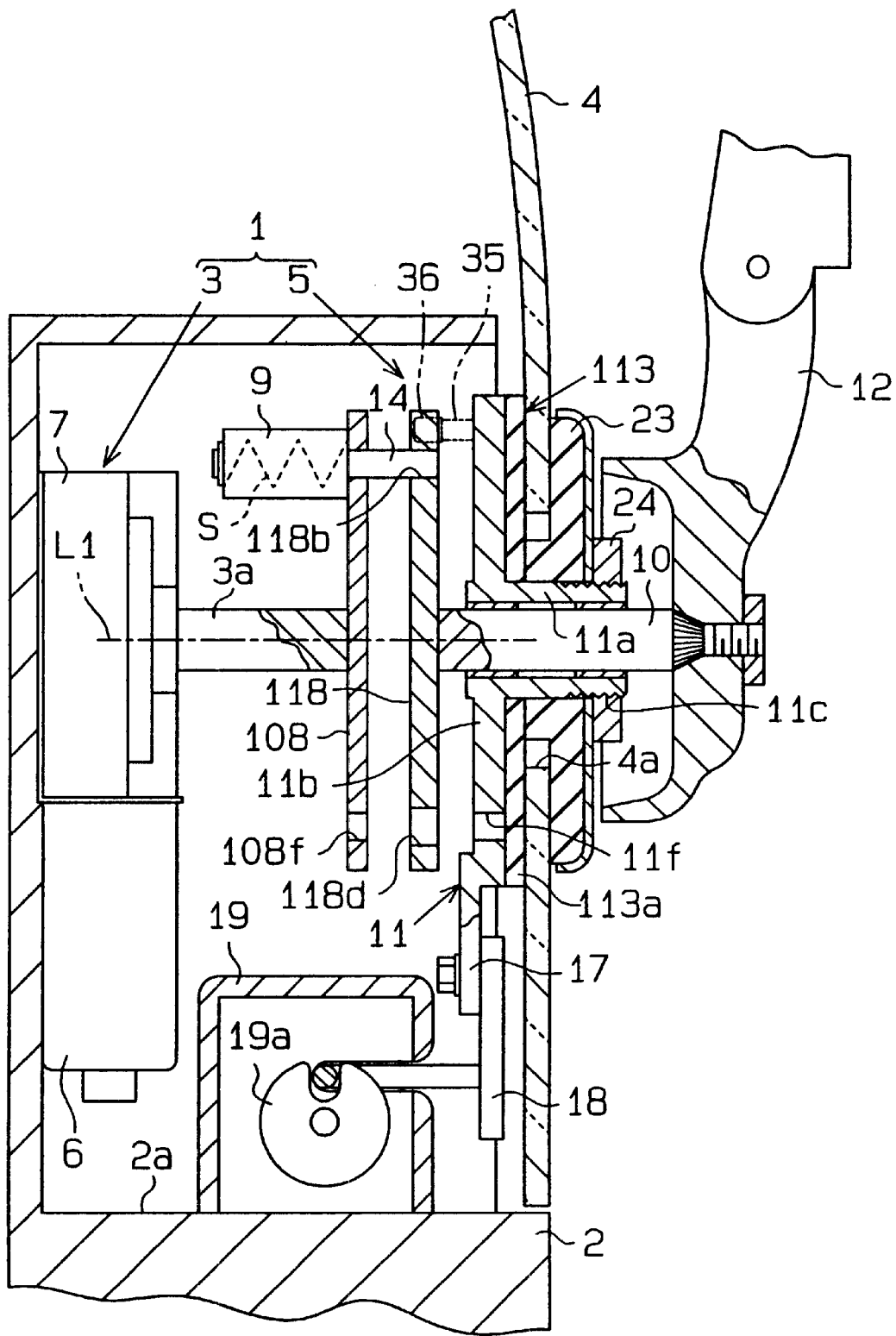
FIG. 25 is a cross-sectional view showing a wiper device according to a further embodiment of the present invention.
Figure 26:
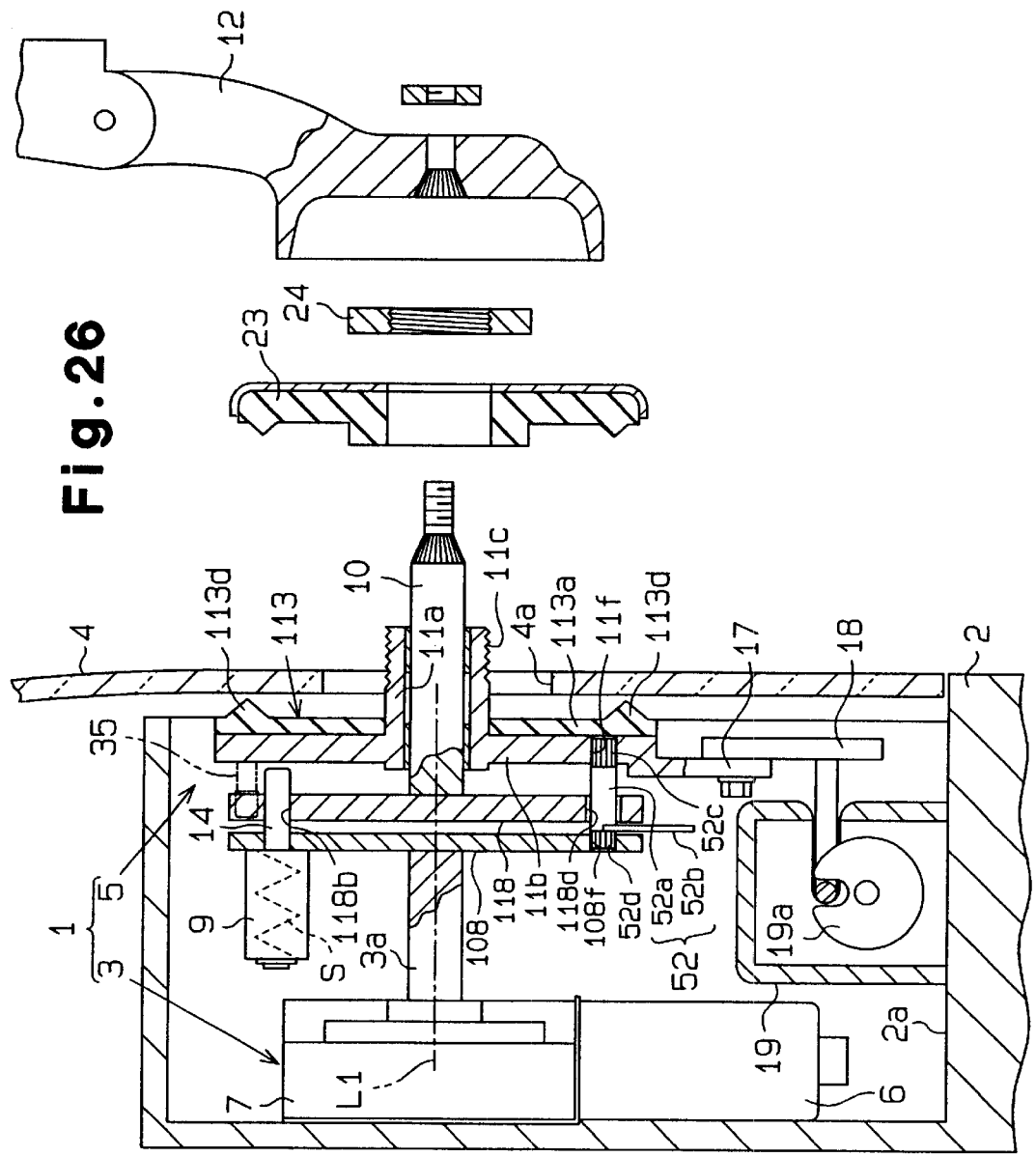
FIG. 26 is a cross-sectional view illustrating a procedure for installing the wiper device of FIG. 25.

A further embodiment of the present invention will now be described with reference to FIGS. 25 and 26, and the description will focus on the differences from the embodiment of FIGS. 17–20. Parts similar to those in the embodiment of FIGS. 17–20 have the same reference numbers. As shown in FIGS. 25 and 26, a detachable positioning jig 52 is used instead of the rotatable positioning pin 131 to position the shaft holder 11 with respect to the actuator 3. In this respect, the embodiment of FIGS. 25 and 26 is similar to the embodiments of FIGS. 1–10.

As shown in FIGS. 25 and 26, the packing 113 includes only the disc 113a and the projection 113d and does not include the cylinder 113a and the annular lip 113c.

The positioning hole 108f is located to correspond to the positioning pin 131 of FIG. 17 and passes through the front pivot disc 108. As shown in FIG. 26, when the wiper device 1 is installed, the positioning jig 52 is press fitted in the positioning hole 108f and also is press fitted in the positioning hole 11f of the shaft holder 11 through the through hole 118d.

The positioning jig 52 includes a cylindrical positioning pin 52a and a handle 52b projecting radially from the positioning pin 52a. One end of the positioning pin 52a is a front press fit portion 52d and the other end is a rear press fit portion 52c. The front press fit portion 52d is press fitted in the positioning hole 108f of the front pivot disc 108, and the rear press fit portion 52c is press fitted in the positioning hole 11f of the shaft holder 11.

The procedure for installing the wiper device 1 will now be described. First, the positioning hole 11f is aligned with the through hole 118d, the rear press fit portion 52c is press fitted in the positioning hole 11f through the through hole 118d, and the front press fit portion 52d is press fitted in the positioning hole 108f of the front pivot disc 108. Simultaneously, the coupler pin 14 is fitted in the coupler hole 118b. As a result, the shaft holder 11 is accurately positioned with respect to the actuator 3 such that the pivot shaft 10 is coaxial with the output shaft 3a.

Next, as shown in FIG. 26, the actuator 3 is fixed to the support 2a of the rear door 2, and the rear window 4 is closed. Then, the outer bushing 23 is fitted on the cylinder 11a, and the nut 24 is fastened to the male thread 11c. As the nut 24 is fastened, the projections 113d of the packing 113 are pressed against the rear window 4, and the position of the transmission unit 5 with respect to the rear window 4 is fixed. Subsequently, the projections 113d are gradually flattened, and at least one of the press fit portions 52c, 52d disengages the corresponding positioning hole 11f, 108f.

In this way, the positioning jig 52 is press fitted in the positioning holes 11f, 108f, the coupler pin 14 is fitted in the coupler hole 118b, and the shaft holder 11 is fixed to the rear window 4. Accordingly, misalignment of the shafts 3a, 10 is prevented when the shaft holder 11 is fixed to the rear window 4.

Subsequently, the rear window 4 is opened, and the positioning jig 52 is removed. When the rear window 4 is closed as shown in FIG. 25, the wiper operates normally.

The embodiment of FIG. 25 has the same advantages as the embodiment of FIGS. 17–20. Any of the positioning jigs 21, 25, 28 shown in the embodiments of FIGS. 17–20 may be used as a positioning jig in the embodiment of FIG. 25.

A further embodiment of the present invention will now be described with reference to FIG. 27, and the description will focus on the differences from the embodiment of FIGS. 17–20. Parts similar to those in the embodiment of FIGS. 17–20 have the same reference numbers.

As shown in FIG. 27, the packing 113 is made of resin and does not have the projections 113d. The resin includes resin materials such as nylon and urethane. Another rubber packing 61 is fixed to the disc 113a of the packing 113. The packing 61 includes the disc 61a and projections 61b. The embodiment of FIG. 27 has the same advantages as the embodiment of FIGS. 17–20. The packings 113, 61 may be used in any one of the embodiments of FIGS. 21–26.

The above illustrated embodiments may be varied as follows.

In any of the embodiments of FIGS. 11–26, the packing 113 may contact the rear window 4 when the rear window 4 is closed during the installation of the wiper device 1. In this case, the projections 113d may be omitted form the packing 113.

In the embodiment of FIGS. 11–14, the front annular projection 108a may be fitted on the peripheral surface of the rear annular projection 118c. The projections 108a, 118c may have any shape as long as the radial movement of the front pivot disc 108 relative to the rear pivot disc 118 is prevented.

In any of the embodiments of FIGS. 17–26, the positioning hole 11f may be omitted from the shaft holder 11, and instead, the through hole 118d of the rear pivot disc 118 may serve as the positioning hole. When the wiper device 1 is installed, the positioning pins 131, 41 and the positioning jig 52 do not reach the shaft holder 11 and are fitted or press fitted in the through hole 118d.

In the embodiment of FIGS. 21–24, the diameter of the through hole 118d of the rear pivot disc 118 may be greater than that of the positioning hole 11f of the shaft holder 11, and the positioning pin may loosely pass through the through hole 118d.

In any of the embodiments of FIGS. 17–24, the positioning pins 131, 41 may be supported by the rear pivot disc 118 or the shaft holder 11, and a positioning hole in which the positioning pins 131, 41 is fitted may be formed in the front pivot disc 108.

In any of the embodiments of FIGS. 11–27, the coupler pin 14 may be supported by the rear pivot disc 118, and a coupler hole for receiving the coupler pin 14 may be formed in the front pivot disc 108.

The present invention may be applied to any wiper devices as long as they are located between a support and a window that pivots relative to the support.

The present examples and embodiments are to be considered as illustrative and not restrictive and the invention is not to be limited to the details given herein, but may be modified within the scope and equivalence of the appended claims.

What is claimed is:

1. A wiper device for wiping a window supported by a support, the wiper device being located between the window and the support, wherein the window opens and closes an opening in the support, the device comprising:

an actuator attached to the support, wherein the actuator has an output shaft and a first coupler member attached to the output shaft, and the actuator pivots the first coupler member in a first angle range;

a power transmission unit, the power transmission unit including a shaft holder attached to the window, a pivot shaft supported by the shaft holder and a second coupler member attached to the pivot shaft, wherein, when the window is closed, the second coupler member is coupled to the firs coupler member to transmit rotation of the output shaft to the pivot shaft;

a wiper arm attached to the pivot shaft, wherein, when the actuator is activated with the second coupler member coupled to the first coupler member, the wiper arm pivots in an angle range corresponding to the first angle range; and a positioning mechanism, wherein, when the wiper device is installed, the positioning mechanism provisionally fixes the position of the power transmission unit relative to the actuator such that the axis of the pivot shaft is aligned with the axis of the output shaft, wherein the positioning mechanism is located between the first coupler member and the shaft holder to connect the shaft holder to the first coupler member.

2. The wiper device according to claim 1, wherein the positioning mechanism releases the power transmission unit relative to the actuator after the actuator is attached to the support and after the shaft holder is attached to the window.

3. The wiper device according to claim 1, wherein the positioning mechanism prevents the power transmission unit from moving relative to the actuator at least in a radial direction of the output shaft.

4. The wiper device according to claim 1, wherein the positioning mechanism connects the power transmission unit to the actuator at a plurality of locations.

5. The wiper device according to claim 1, wherein the first coupler member includes a first engagement member, which is radially spaced from the axis of the output shaft, and the second coupler member includes a second engagement member, which is radially spaced from the axis of the pivot shaft, such that, when the engagement members are engaged with each other, the second coupler member is coupled to the first coupler member to transmit rotation of the output shaft to the pivot shaft.

6. The wiper device according to claim 5, wherein the positioning mechanism remains out of a path of the engagement members.

7. The wiper device according to claim 1, wherein each of the first coupler member and the shaft holder has an opening for receiving a jig, which is adapted to connect the shaft holder to the first coupler member.

8. The wiper device according to claim 1, wherein the positioning mechanism includes a projection formed on one of the actuator and the power transmission unit, and an opening is formed in the other one of the actuator and the power transmission unit to receive the projection.

9. A wiper device for wiping a window supported support, the wiper device being located between the window and the support, wherein the window opens and closes an opening in the support, the device comprising:

an actuator attached to the support, wherein the actuator has an output shaft and a first coupler member attached to the output shaft, and the actuator pivots the first coupler member in a first angle range;

a power transmission unit, the power transmission unit including a shaft holder attached to the window, a pivot shaft supported by the shaft holder and a second coupler member attached to the pivot shaft, wherein, when the window is closed, the second coupler member is coupled to the first coupler member to transmit rotation of the output shaft to the pivot shaft;

a wiper arm attached to the pivot shaft, wherein, when the actuator is activated with the second coupler member coupled to the first coupler member, the wiper arm pivots in an angle range corresponding to the first angle range; and a positioning mechanism, wherein, when the wiper device is installed, the positioning mechanism provisionally fixes the position of the power transmission unit relative to the actuator such that the axis of the pivot shaft is aligned with the axis of the output shaft, wherein the positioning mechanism includes a movable member located on one of the actuator and the power transmission unit, wherein the movable member is movable between a first position, at which the movable member fixes the position of the power transmission unit relative to the actuator, and a second position, at which the movable member cannot fix the position of the power transmission unit.

10. The wiper device according to claim 9, wherein an urging member urges the movable member toward the second position, wherein, when the window is opened after the actuator is attached to the support and after the shaft holder is attached to the window, the urging member moves the movable member from the first position to the second position.

11. The wiper device according to claim 9, wherein the movable member comprises a pin located on one of the actuator and the power transmission unit, and an opening is formed in the other one of the actuator and the power transmission unit to receive the pin.

12. The wiper device according to claim 11, wherein the pin is pivotal about one of its ends, and the pin is pivoted to the first position to enter the opening and is pivoted to the second position not to enter the opening.

13. The wiper device according to claim 12, wherein the pin is pivotably supported by the first coupler member, and the opening is formed in at least one of the second coupler member and the shaft holder, wherein the pin is parallel to the axis of the output shaft to protrude from the first coupler member when in the first position, and the pin is perpendicular to the axis of the output shaft to lie on the first coupler member when in the second position.

14. The wiper device according to claim 11, wherein the pin is movable in the axial direction and is movable between the first position and the second position in plane that is perpendicular to the axis of the pin, wherein the pin is moved to the first position to enter the opening and is moved to the second position not to enter the opening.

15. The wiper device according to claim 14, wherein the pin is supported by the first coupler member to extend parallel to the output shaft, the opening is formed in at least one of the second coupler member and the shaft holder, and the pin is urged to protrude from the first coupler member and is urged from the first position to the second position.

16. A wiper device for wiping a window supported by a support, the wiper device being located between the window and the support, wherein the window opens and closes an opening in the support, the device comprising:

an actuator attached to the support, wherein the actuator has an output shaft and a first coupler member attached to the output shaft, and the actuator pivots the first coupler member in a first angle range;

a power transmission unit, the power transmission unit including a shaft holder attached to the window, a pivot shaft supported by the shaft holder and a second coupler member attached to the pivot shaft, wherein, when the window is dosed, the second coupler member is coupled to the first coupler member to transmit rotation of the output shaft to the pivot shaft;

a wiper arm attached to the pivot shaft, wherein, when the actuator is activated with the second coupler member coupled to the first coupler member, the wiper arm pivots in an angle range corresponding to the first angle range;

a positioning mechanism, wherein, when the wiper device is installed, the positioning mechanism provisionally fixes the position of the power transmission unit relative to the actuator such that the axis of the pivot shaft is aligned with the axis of the output shaft; and a holding mechanism, wherein, when the positioning mechanism fixes the position of the power transmission unit relative to the actuator, the holding mechanism resists axial movement between the power transmission unit and the actuator.

17. The wiper device according to claim 16, wherein the holding mechanism includes a flexible member enganges the first coupler member.

18. A wiper device for wiping a window supported by a support, the wiper device being located between the window and the support, wherein the window opens and closes an opening in the support, the device comprising:

an actuator attached to the support, wherein the actuator has an output shaft and a first coupler member attached to the output shaft, wherein the actuator pivots the first coupler member in a first angle range, and where in the first coupler member includes a first engagement member, which is radially spaced from the axis of the output shaft;

a power transmission unit, the power transmission unit including a shaft holder attached to the window, a pivot shaft supported by the shaft holder and a second coupler member attached to the pivot shaft, wherein the second coupler member includes a second engagement member, which is radially spaced from the axis of the pivot shaft, and wherein, when the window is closed, the first and second engagement members are engaged with each other to transmit rotation of the output shaft to the pivot shaft;

a wiper arm attached to the pivot shaft, wherein, when the actuator is activated with the first and second engagement members engaged with each other, the wiper arm pivots in an angle range corresponding to the first angle range; and a positioning mechanism, wherein, when the wiper device is installed, the positioning mechanism provisionally fixes the position of the power transmission unit relative to the actuator such that the axis of the pivot shaft is aligned with the axis of the output shaft, wherein the positioning mechanism is located between the first coupler member and the second coupler member to connect the second coupler member to first coupler member, and wherein the positioning mechanism is radially spaced from the axis of the output shaft and the pivot shaft and is spaced from the first and second engagement members.

19. The wiper device according to claim 18, wherein the positioning mechanism connects the power transmission unit to the actuator at a plurality of locations.

20. The wiper device according to claim 18, wherein the positioning mechanism remains out of the path of the engagement members.

* * * * *